(12) United States Patent
Yumoto et al.

(10) Patent No.: US 6,846,540 B2
(45) Date of Patent: Jan. 25, 2005

(54) OPTICALLY ACTIVE POLYESTERAMIDES, PHOTOREACTIVE CHIRAL AGENTS, LIQUID CRYSTAL COMPOSITIONS, LIQUID CRYSTAL COLOR FILTERS, OPTICAL FILMS AND RECORDING MEDIA, AS WELL AS METHOD FOR CHANGING HELICAL STRUCTURE OF LIQUID CRYSTALS, AND METHOD FOR FIXING HELICAL STRUCTURE OF LIQUID CRYSTALS

(75) Inventors: Masatoshi Yumoto, Shizuoka-ken (JP); Mitsuyoshi Ichihashi, Kanagawa (JP); Keiichiro Hayashi, Shizuoka-ken (JP); Ryuichi Kuroiwa, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 33 days.

(21) Appl. No.: 10/419,260

(22) Filed: Apr. 21, 2003

(65) Prior Publication Data

US 2004/0011994 A1 Jan. 22, 2004

(30) Foreign Application Priority Data

Apr. 19, 2002 (JP) ........................................ 2002-117814

(51) Int. Cl.$^7$ ................................................ B32B 3/02
(52) U.S. Cl. ..................... 428/64.1; 428/64.4; 428/64.8; 430/270.14
(58) Field of Search ............................... 428/64.1, 64.4, 428/64.8, 913; 430/270.14, 495.1, 945

(56) References Cited

FOREIGN PATENT DOCUMENTS

| GB | 2 314 389 A | 12/1997 |
|----|-------------|---------|
| JP | 11-500160 A | 1/1999 |

(List continued on next page.)

Primary Examiner—Elizabeth Mulvaney
(74) Attorney, Agent, or Firm—Sughrue Mion, PLLC

(57) ABSTRACT

The invention provides an optically active polyesteramide comprising at least a structural unit represented by the following general formula (I) and a structural unit represented by the following general formula (II).

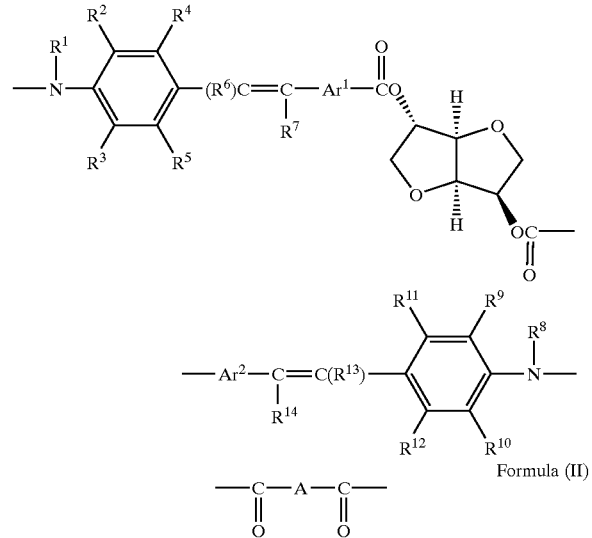

In the general formula (I), $R^1$ and $R^8$ independently represent a hydrogen atom, an alkyl group, or an aryl group. $R^2$ to $R^5$ and $R^9$ to $R^{12}$ independently represent a hydrogen atom, a halogen atom, an alkyl group, or an alkoxy group. $R^1$ and $R^2$ as well as $R^8$ and $R^9$ may form a 5- or 6-membered ring. $R^6$ and $R^7$ as well as $R^{13}$ and $R^{14}$ independently represent a hydrogen atom or an alkyl group. $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group. In the general formula (II), A represents a divalent substituent.

20 Claims, 3 Drawing Sheets

FOREIGN PATENT DOCUMENTS

| | | |
|---|---|---|
| JP | 2002-080851 A | 3/2002 |
| JP | 2002-338668 A | 11/2002 |
| WO | WO 98/34974 | 8/1998 |
| WO | WO 00/34808 | 6/2000 |

OPTICALLY ACTIVE POLYESTERAMIDES, PHOTOREACTIVE CHIRAL AGENTS, LIQUID CRYSTAL COMPOSITIONS, LIQUID CRYSTAL COLOR FILTERS, OPTICAL FILMS AND RECORDING MEDIA, AS WELL AS METHOD FOR CHANGING HELICAL STRUCTURE OF LIQUID CRYSTALS, AND METHOD FOR FIXING HELICAL STRUCTURE OF LIQUID CRYSTALS

BACKGROUND OF THE INVENTION

1. Field of Invention

The present invention relates to optically active polyesteramides, photoreactive chiral agents causing a change of liquid crystal structure, and liquid crystal compositions, optical films, liquid crystal color filters and recording media containing the photoreactive chiral agents, as well as a method for changing or fixing the helical structure of liquid crystals.

2. Description of the Related Art

In recent years, liquid crystal materials have attracted a great deal of attention. For example, cholesteric liquid crystal compounds, which have a helical structure and display colorful selective reflection colors due to the twisting power (twisting angle) of the helix, are excellent in selective reflectance and in color purity of selective reflected ray, and have widely been used in optical films, liquid crystal color filters and recording media.

The following is a specific example of color filters.

For example, color filters used in color liquid crystal displays are comprised of respective pixels of red (R), green (G) and blue (B) and black matrix formed in gaps between the pixels for improving the display contrast. Such color filters conventionally employed include mainly those made by dispersing a pigment or pigments into to resins or dyeing resins with dyestuffs. In producing such color filters, it was general to apply a color resin solution on a glass substrate by spin coating to form a colored resist layer followed by patterning of the layer by a photolithography technique to form color filter pixels, or to print colored pixels directly on a substrate.

In the printing process, however, there is a disadvantage that it is difficult to form a very fine image pattern because of a low resolution of the pixels. In the spin coat process, there are disadvantages of a large loss of materials and when applied to a substrate having a large area coating non-uniformities are large. Furthermore, in an electrodeposition process, it is possible to obtain a relatively high resolving color filter with few non-uniformities in the color layer, but there is a disadvantage that the manufacturing process is complicated and managing the solutions used in this process is difficult.

Therefore, provision a process for conveniently producing color filters of high quality in high efficiency with little loss of raw materials has been desired.

On the other hand, as for the performance of the color filters, high transmittance and high color purity have been required. In recent years, in order to satisfy such requirements, it has been attempted to optimize the kind of dyestuffs or staining resins in a process of using dyestuffs or to use a finely dispersed pigment in a process of using pigments. In a current liquid crystal display (LCD) panel, however, a demand for the transmittance and color purity of color filters is very high, particularly in a reflex LCD color filter it is difficult to achieve both paper white display/contrast and color reproducibility. On the other hand, since all color filters prepared by depositing dyestuffs in resins or dispersing a pigment in resins according to the conventional process are of light absorption type, an improvement of color purity by means of further enhancement of transmittance has substantially reached the upper limits.

In such a situation, a color filter of polarization type comprising cholesteric liquid crystal as major component has been known. This color filter of polarization type, since it displays an image by reflecting a certain quantity of light and transmitting the rest, has a high utilization efficiency for light and much higher performance with respect to transmittance and color purity than color filters of the light absorption type. On the other hand, in producing such a filter, it is usual to employ a spin coating process to form a film on a substrate since the resulting film has uniform thickness, however, the spin coating method is disadvantageous in cost because of a great loss of materials.

In order to solve the above-mentioned problems, as a means, which ensure uniformity of color purity on the color filter film and can realize reduction of the production steps, methods using chiral compounds of photoreactive type are effective. This process is based on the principle that when a liquid crystal composition containing a chiral compound of photoreactive type is irradiated with light at the reactive wavelength of the chiral compound in a pattern shape, the reaction of the chiral compound proceeds in accordance with the intensity of irradiation energy to change the helical pitch (helical twisting angle), resulting in formation of selective reflection colors for every pixel only by pattern exposure different in the quantity of light. Thus, there is an advantage that the patterning in formation of a color filter may be completed by one mask exposure using a mask having different quantities of transmitted light.

Therefore, after patterning by image wise irradiating light, the patterned cholesteric liquid crystal compound can be fixed to form a film acting as a color filter. This technique can be applied to optical films or record of images.

Particularly, when a color filter is made by single mask exposure, being able to form the primaries of B (blue), G (green) and R (red) with high color purity in a single exposure is desired. When the rate of twisting change in liquid crystals is small, however, sufficient color purity cannot be attained. Therefore, in order to make the primaries display by single exposure with high color purity, it is necessary to use a highly twisted chiral compound (chiral agent) which can change significantly the twisting power of the helical structure in liquid crystals. In other words, the use of a highly twisted chiral compound allows expansion of the width of the hue, which is selectively reflected depending on the change of light quantity.

As for such chiral agents, the present applicant has previously filed patent applications involving low molecular photoreactive chiral agents having an isosorbide skeletal structure (Japanese Patent Application No. 2001-5740) and high molecular photoreactive chiral agents (Japanese Patent Application No. 2001-144532). Moreover, WO 00/34808 discloses low molecular photoreactive chiral agents having a benzylidene menthone skeletal structure.

On the other hand, when the cholesteric liquid crystal compound is fixed after patterning by imagewise irradiation of light, an image with good resolution can not be obtained if the pattern is not maintained during the interval from after patterning to fixing.

The light source used in mask exposure is usually an ultrahigh pressure mercury lamp having an emission line at 365 nm. Accordingly, it is desired to conduct the mask exposure with a chiral agent having the high molar absorption coefficient in this range of wavelength in order to enhance the reaction rate of the chiral compound at high sensitivity.

The above-mentioned chiral agents, however, cannot obtain an image having excellent sensitivity. Alternatively, there are problems that a molar absorption coefficient thereof is small at 365 nm decreasing the sensitivity during mask exposure and that the cis-isomer after photoisomerization is poor in thermal stability.

SUMMARY OF THE INVENTION

As described above, a photoreactive chiral agent allowing the helical pitch (twisting power, helical twisting angle) to significantly change has not yet been provided; that is, there is no chiral agent which provides a photoreactivity allowing the change of an orentation structure such as the helical pitch (twisting power) of liquid crystals depending on the quantity of irradiated light, and for example, in a cholesteric liquid crystal phase containing a nematic liquid crystal compound, a colorful selective reflection will be displayed because the selective reflection is allowed in a wide range of the wavelength, thus allowing the primaries (B, G, and R) displaying in high color purity and high resolution.

The purpose of the invention is to solve many prior problems as mentioned above and to achieve the following objects.

First, the invention aims to provide a novel optically active compound which has photosensitivity to allow the structural change by photo-isomerization and of which the cis-isomer after photo-isomerization is superior in thermal stability.

Secondly, the invention aims to provide a photoreactive chiral agent which can control the orientation of liquid crystal compounds and has a high level of the change ratio for the helical pitch (twisting power) (hereinafter sometimes referred to as "twist change ratio") of liquid crystals by light; for example, in a cholesteric liquid crystal phase, the selective reflection involving the primaries (B, G, and R) is allowed to display the primaries in high color purity and in high resolution.

Thirdly, the invention aims to provide a liquid crystal composition which comprises a photoreactive chiral agent allowing the change of the helical pitch (twisting power) of liquid crystals and having a high twist change ratio to significantly control sterically the orientation of the liquid crystal molecule to convert the optical character; for example, in a cholesteric liquid crystal, a wide range of the selective reflection color involving the primaries (B, G, and R) is displayed, allowing to display the primaries by irradiation in high color purity and in high resolution.

Fourthly, the invention aims to provide a method for changing the helical structure of liquid crystals which comprises significantly changing the helical pitch (twisting power) of liquid crystals by irradiating light to a liquid crystal composition containing a photoreactive chiral agent with a high twist change ratio.

Fifthly, the invention aims to provide a method for fixing the helical structure of liquid crystals by which a liquid crystal composition containing a photoreactive chiral agent with a high twist change ratio can be maintained and fixed after irradiation as visual imagery without damaging the patterned helical pitch; particularly, when the liquid crystal phase is of cholesteric liquid crystals, the helical structure of liquid crystals is fixed at the desired selective reflection color to give hue in high purity.

Sixthly, the invention aims to provide a color filter of liquid crystals in high color purity which contains a photoreactive chiral agent causing a significant change in the helical pitch (twisting power) of liquid crystals by irradiation.

Seventhly, the invention aims to provide a light non-absorption type optical film containing a photoreactive chiral agent causing a significant change in the twisting power of liquid crystals by irradiation; for example, in a cholesteric liquid crystal phase, it is possible to provide an optical film having a wide range of selective reflection and high color purity.

Eighthly, the invention aims to provide a recording medium which contains a photoreactive chiral agent causing a significant change in the twisting power of liquid crystals by irradiation and can form a fine image by changing the quantity of light as visual imagery; for example, when the liquid crystal phase is of cholesteric liquid crystals, the recording medium can form a visual image which comprises selective reflection colors having a wide range of hue and high color purity.

In the invention, the above-mentioned problems can be solved as follows. In a first embodiment, the invention provides an optically active polyesteramide that comprises at least a structural unit represented by the following general formula (I) and a structural unit represented by the following general formula (II).

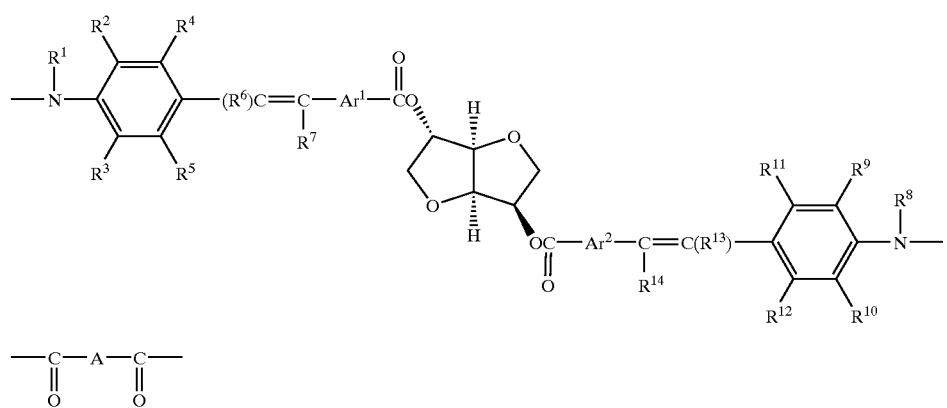

Formula (I)

Formula (II)

In the general formula (I), $R^1$ and $R^8$ independently represent a hydrogen atom, an alkyl group, or an aryl group. $R^2$ to $R^5$ and $R^9$ to $R^{12}$ independently represent a hydrogen atom, a halogen atom, an alkyl group, or an alkoxy group. $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group. $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group.

In the general formula (II), A represents a divalent substituent.

In a second embodiment, the invention provides an optically active polyesteramide that comprises at least a structural unit represented by the following general formula (III) and a structural unit represented by the following general formula (IV).

mentioned optically active polyesteramide and photo-polymerization initiator have respectively different photo-sensitive wavelength ranges.

In another aspect, the invention provides a method for changing the helical structure formed by the above-mentioned liquid crystal compound, the method comprising the steps of irradiating the above-mentioned liquid crystal composition and changing the structure of the above-mentioned optically active polyesteramide.

In another aspect, the invention provides a method for fixing the helical structure formed by the above-mentioned liquid crystal compound, the method comprising the steps of irradiating as visual imagery the above-mentioned liquid crystal composition with light in a range of photosensitive wavelength of the above-mentioned optically active polyesteramide, and polymerizing by irradiating the composition with light in a range of photosensitive wavelength of the above-mentioned photo-polymerization initiator for photo-polymerization.

Formula (III)

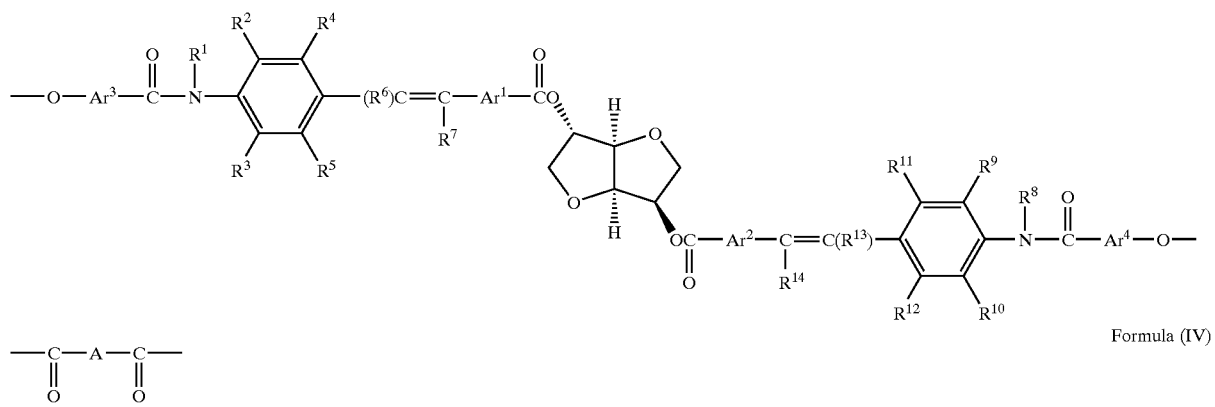

Formula (IV)

In the general formula (III), $R^1$ and $R^8$ independently represent a hydrogen atom, an alkyl group, or an aryl group. $R^2$ to $R^5$ and $R^9$ to $R^{12}$ independently represent a hydrogen atom, a halogen atom, an alkyl group, or an alkoxy group. $R^1$ and $R^2$ as well as $R^8$ and $R^9$ may form a 5- or 6-membered ring. $R^6$ and $R^7$ as well as $R^{13}$ and $R^{14}$ independently represent a hydrogen atom or an alkyl group. $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group. $Ar^3$ and $Ar^4$ independently represent a divalent aromatic group.

In the general formula (IV), A represents a divalent substituent.

In another aspect, the invention provides a photoreactive chiral agent comprising an optically active polyesteramide of the first or second embodiment.

In another aspect, the invention provides a liquid crystal composition comprising a liquid crystal compound and an optically active polyesteramide of the first or second embodiment.

In another aspect, the invention provides the above-mentioned liquid crystal composition which further comprising a photo-polymerization initiator, and in which the above-mentioned liquid crystal compound has at least one polymerizing group.

In another aspect, the invention provides the above-mentioned liquid crystal composition in which the above- In another aspect, the invention provides a liquid crystal color filter which comprises a liquid crystal compound and at least one type of optically active polyesteramide of the above-mentioned first or second embodiment.

In another aspect, the invention provides an optical film that comprises at least a liquid crystal compound and at least one type of optically active polyesteramide of the above-mentioned first or second embodiment.

In another aspect, the invention provides a recording medium that comprises a liquid crystal compound and at least one type of optically active polyesteramide of the above-mentioned first or second embodiment.

DESCRIPTION OF THE PREFERABLE EMBODIMENTS

Optically Active Polyesteramides

Figure 1A:
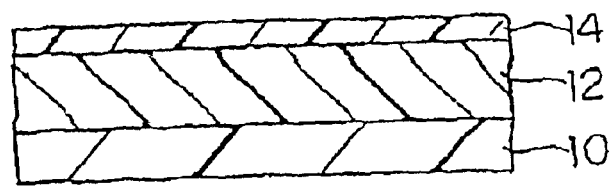
FIGS. 1A through 1D are diagrammatic sketches showing a part of the process for producing a liquid crystal color filter of the invention.

The optically active polyesteramide of the first invention comprises at least the structural units represented by the following general formulae (I) and (II).

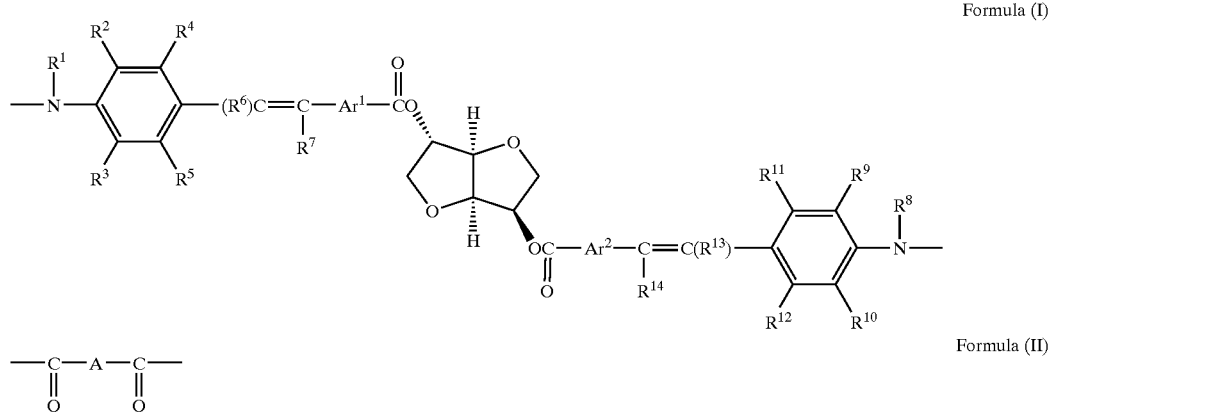

Formula (I)

Formula (II)

The optically active polyesteramide of the second invention comprises at least the structural units represented by the following general formulae (III) and (IV).

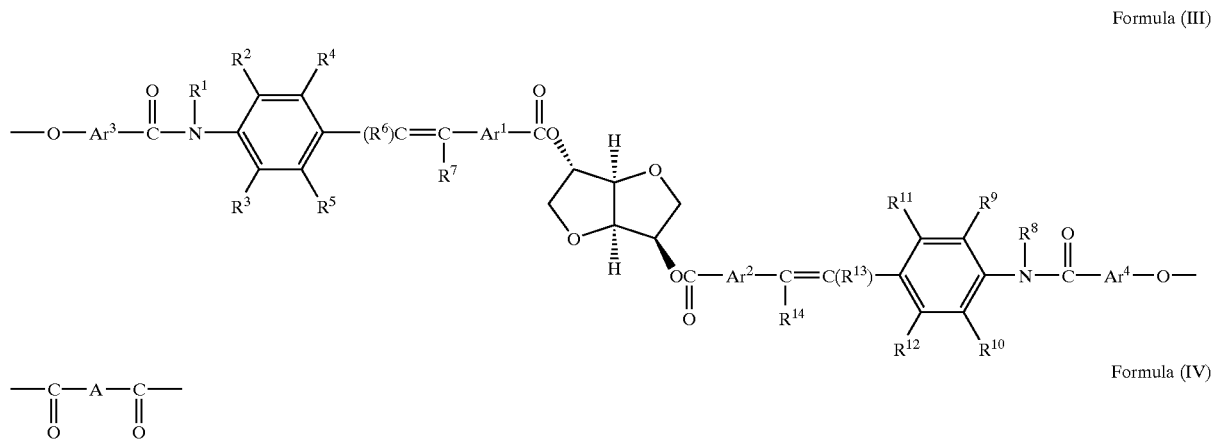

Formula (III)

Formula (IV)

Structural Unit of the General Formula (I)

The alkyl group represented by $R^1$ and $R^8$ are preferably alkyl groups having 1 to 20 carbon atoms, particularly alkyl groups having 1 to 8 carbon atoms, which may be substituted or unsubstituted. The preferable substituent is exemplified by halogen atom and alkoxy group.

Specific example of the alkyl group includes a methyl group, a butyl group, a trifluoromethyl group, a methoxyethyl group, and the like.

The aryl groups represented by $R^1$ and $R^8$ are preferably aryl groups having 6 to 30 carbon atoms, particularly aryl groups having 6 to 20 carbon atoms, which may be substituted or unsubstituted by a substituent or substituents. The substituent includes preferably a halogen atom, an alkyl group, and an alkoxy group.

Specific example of the aryl group includes a phenyl group, a β-naphthyl group, a 4-methylphenyl group, a 4-chlorophenyl group, a 4-methoxyphenyl group, and the like.

Among the groups represented by $R^1$ and $R^8$, $R^1$ and $R^8$ are preferably hydrogen atoms, or $R^1$ and $R^2$ as well as $R^8$ and $R^9$ taken each other preferably form a 5- or 6-membered ring. In addition, $R^1$ and $R^8$ preferably represent the same groups.

The preferable halogen atom represented by $R^2$ to $R^5$ and $R^9$ to $R^{12}$ includes fluorine atom and chlorine atom, particularly fluorine atom.

The alkyl group represented by $R^2$ to $R^5$ and $R^9$ to $R^{12}$ are the same as those represented by $R^1$ and $R^8$, including the preferable specific examples.

The alkoxy group represented by $R^2$ to $R^5$ and $R^9$ to $R^{12}$ are preferably alkoxy groups having 1 to 20 carbon atoms, particularly alkoxy groups having 1 to 8 carbon atoms, which may be substituted or unsubstituted by a substituent or substituents. The preferable substituent is halogen atom.

The specific example of the alkoxy group includes methoxy, trifluoromethoxy, and the like.

Among the groups represented by $R^2$ to $R^5$ and $R^9$ to $R^{12}$, preferable are hydrogen atom, alkyl group and alkoxy group. Particularly, the cases where all of $R^2$ to $R^5$ are hydrogen atoms or one of them represents an alkyl group or alkoxy group and all of $R^9$ to $R^{12}$ are hydrogen atoms or one of them represents an alkyl group or alkoxy group are preferable. In addition, the cases where $R^2$ and $R^9$, $R^3$ and $R^{10}$, $R^4$ and $R^{11}$ and $R^5$ and $R^{12}$ represent the same groups are preferable.

When $R^1$ and $R^2$ taken each other form a 5- or 6-membered ring, the rings which are constituted by carbon atom(s) and nitrogen atom(s) or by carbon atoms(s), nitrogen atom(s) and oxygen atom(s) are preferable.

The rings represented by the following formulae are particularly preferable.

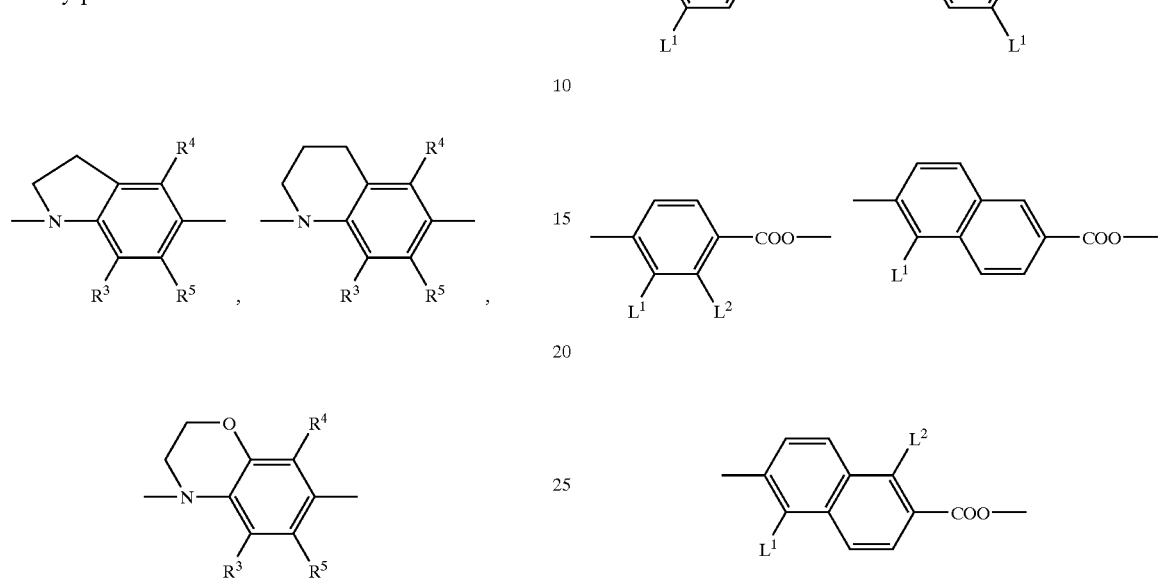

Similarly, when $R^8$ and $R^9$ taken each other form a 5- or 6-membered ring, the rings which are constituted by carbon atom(s) and nitrogen atom(s) or by carbon atoms(s), nitrogen atom(s) and oxygen atom(s) are preferable.

Particularly preferable 5- or 6-membered ring is the same as above, where $R^3$, $R^4$ and $R^5$ in the above formula may be replaced by $R^{10}$, $R^{11}$ and $R^{12}$, respectively.

The alkyl groups represented by $R^6$, $R^7$, $R^{13}$ and $R^{14}$ have the same significance as those represented by $R^1$ and $R^8$, and the specific examples are also the same. In particular, $R^6$, $R^7$, $R^{13}$ and $R^{14}$ are preferably hydrogen atoms, and the cases where $R^6$ and $R^{13}$, or $R^7$ and $R^{14}$, represent the same groups are preferable.

$Ar^1$ and $Ar^2$ independently represent 1,4-phenylene, naphthalene-2,6-diyl, or 1,4-phenylene or naphthalene-2,6-diyl substituted by 1 or more of halogen atom, alkyl group or alkoxy group, or a single bond.

The halogen atom, alkyl and alkoxy groups substituted on $Ar^1$ and $Ar^2$ have the same significance as the halogen atom, alkyl and alkoxy groups represented by $R^2$ to $R^5$ and $R^9$ to $R^{12}$, including the preferable groups.

As for —$Ar^1$—COO— or —$Ar^2$—COO—, the following groups are preferable.

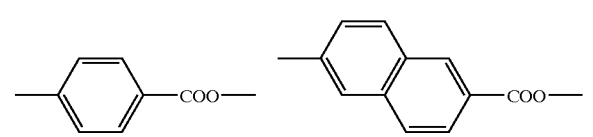

$L^{1,2}$: halogen, alkyl, or alkoxy

Among the groups represented by $Ar^1$ and $Ar^2$, particularly 1,4-phenylene, naphthalene-2,6-diyl, and a single bond are preferable, with a single bond being most preferable.

Also, the cases where $Ar^1$ and $Ar^2$ represent the same groups are preferable.

In the structural unit represented by the general formula (I) of the invention, there is a double bond between the isosorbide nucleus and the benzene ring, producing geometrical isomers (cis- and trans-isomers) depending on the difference of the configuration. In the structural unit of the general formula (I) of the invention, both cis- and trans-isomers or their mixtures are contained. In this situation, it is preferable to use such a unit that is a trans-isomer before irradiation but converted into a cis-isomer after irradiation in view that it has a high change ratio for the twisting power and can readily be synthesized.

The followings indicate the specific structural units (the units 1-1 to 12 and 2-1 to 5) represented by the general formula (I) of the invention. The units of the invention, however, are not limited to them, and include their geometrical isomers, i.e., cis-isomers.

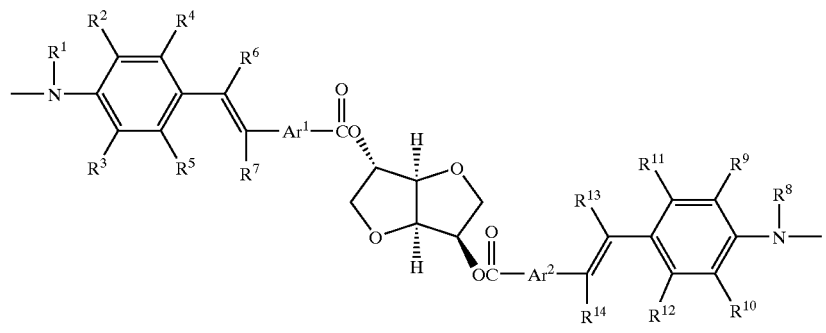
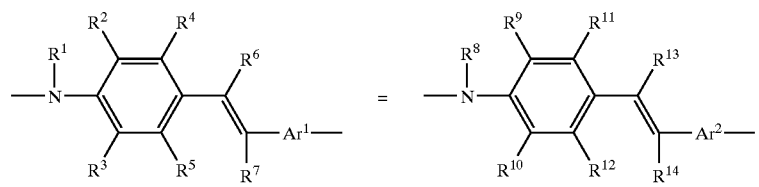
| No. | | No. | |
|---|---|---|---|
| 1-1 | 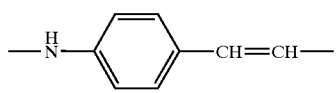 | 1-7 | 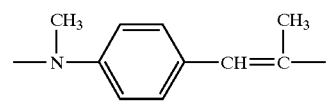 |
| 1-2 | 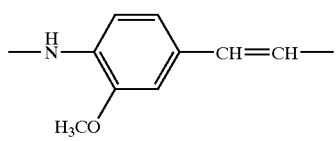 | 1-8 | 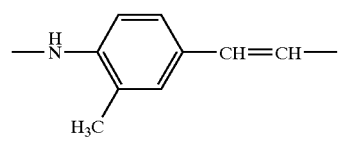 |
| 1-3 | 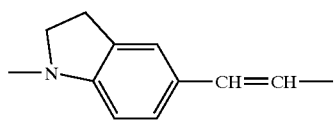 | 1-9 | 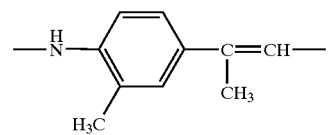 |
| 1-4 | 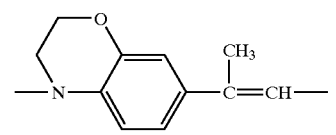 | 1-10 | 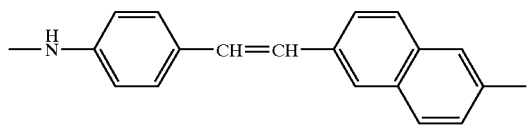 |
| 1-5 | 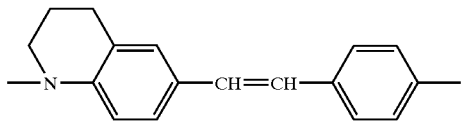 | 1-11 | 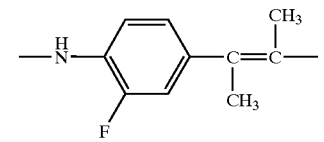 |
| 1-6 | 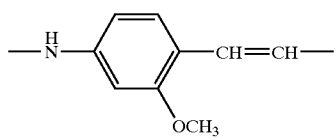 | 1-12 | 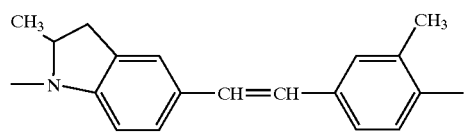 |

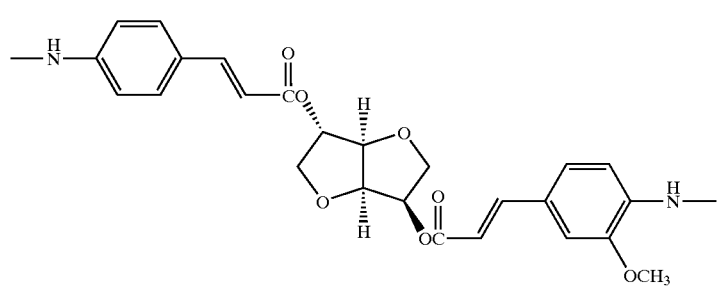

2-1

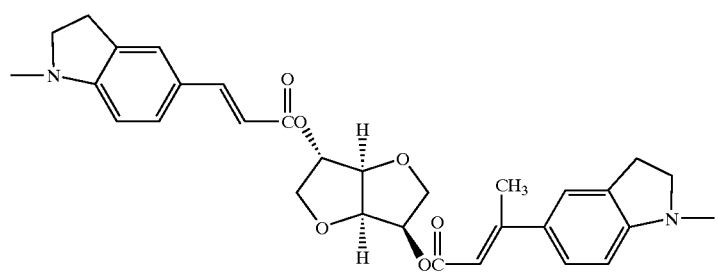

2-2

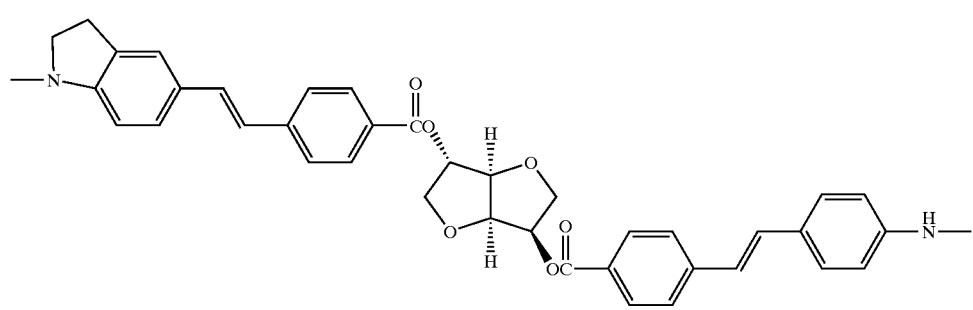

2-3

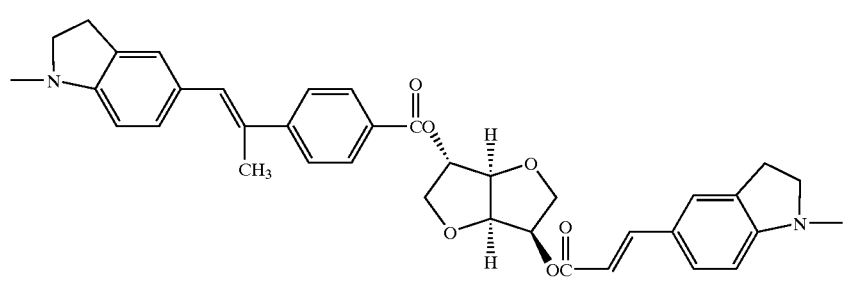

2-4

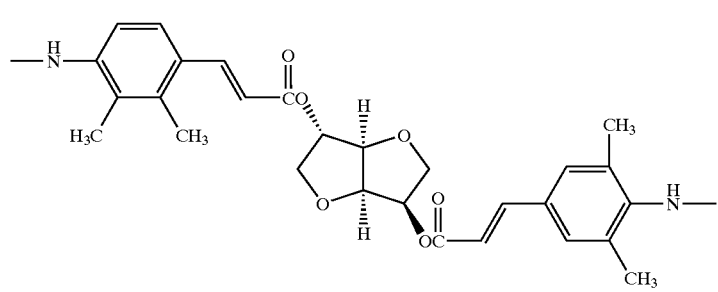

2-5

The Structural Units of the General Formula (III)

In the second invention, $R^1$ and $R^8$, $R^2$ to $R^5$ and $R^9$ to $R^{12}$, $R^6$ and $R^7$, $R^{13}$ and $R^{14}$, and $Ar^1$ and $Ar^2$ in the general formula (III) have the same significance as $R^1$ and $R^8$, $R^2$ to $R^5$ and $R^9$ to $R^{12}$, $R^6$ and $R^7$, $R^{13}$ and $R^{14}$, and $Ar^1$ and $Ar^2$ in the general formula (I), including the preferable groups.

As for the divalent aromatic groups represented by $Ar^3$ and $Ar^4$, those having 6 to 30 carbon atoms are preferable, with those having 6 to 20 carbon atoms being particularly preferable.

Among the divalent aromatic groups, the followings groups are particularly preferable.

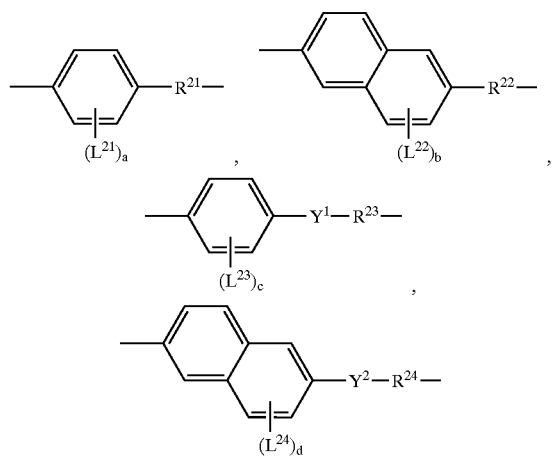

In the above formulae, $R^{21}$ and $R^{22}$ are groups forming bonds with the oxygen atom in the general formula (III), including a single bond, 1,4-phenylene in which one or more of CH groups may be replaced with N, or naphthalene-2,6-diyl; these groups may be unsubstituted totally or substituted by one or more of halogen atoms, alkyl groups having 1 to 6 carbon atoms and alkoxy groups. Among these groups, the single bond or 1,4-phenylene is preferable, with the single bond being particularly preferable.

In the above formulae, $R^{23}$ and $R^{24}$ are groups forming bonds with the oxygen atom in the general formula (III) and have the same significance as those of $R^{21}$ and $R^{22}$ from which the single bonds are excluded. Among them, 1,4-phenylene is preferable.

In the above formulae, $Y^1$ and $Y^2$ represent substituted or unsubstituted ethenylene or ethynylene groups. The substituent of the ethenylene includes alkyl groups having 1 to 56 carbon atoms, alkoxycarbonyl groups having 2 to 10 carbon atoms, aryl group having 6 to 16 carbon atoms, and cyano, with unsubstituted ethenylene or ethynylene being particularly preferable.

As $L^{21}$ to $L^{24}$ in the above formulae, halogen atom, alkyl and alkoxy groups having 1 to 6 carbon atoms are preferable, with alkoxy groups having 1 to 6 carbon atoms being particularly preferable.

In the above formulae, a to d represent an integer of 0 to 4, particularly 0 or 1 is preferable.

The particularly preferable divalent aromatic group is represented by the following formula.

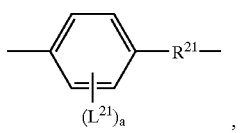

The divalent aromatic groups are exemplified by the following groups. In the following formulae, the respective groups form a bonding with the oxygen atom at the right end. The symbols $L^{25}$ to $L^{27}$ in the formulae represent halogen atoms, alkyl and alkoxy groups having 1 to 6 carbon atoms.

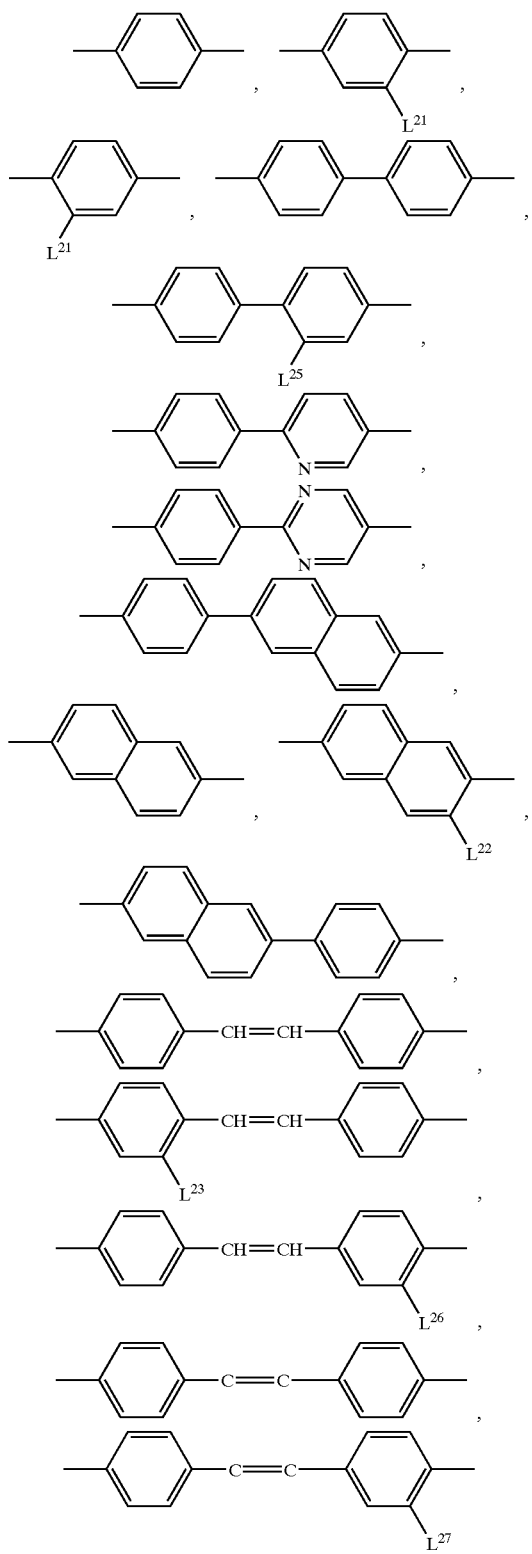

The halogen atoms exemplified as substituents in $R^{21}$ to $R^{24}$ or represented by $L^{21}$ to $L^{27}$ include preferably fluorine atom, chlorine atom and bromine atom, with a fluorine atom being particularly preferable.

The alkyl groups exemplified as substituents in $R^{21}$ to $R^{24}$ or $Y^1$ to $Y^2$ or represented by $L^{21}$ to $L^{27}$ may be of straight or branched chain and may be substituted by halogen atom(s) or alkoxy group(s).

The alkoxy groups exemplified as substituents in $R^{21}$ to $R^{24}$ or represented by $L^{21}$ to $L^{27}$ may be of straight or branched chain and may be substituted by halogen atom(s) or alkoxy group(s).

The alkoxycarbonyl groups exemplified as substituents in $Y^1$ and $Y^2$ may be of straight or branched chain and may be substituted by halogen atom(s), alkoxy group(s), alkenyl group(s) or aryl group(s). The aryl groups exemplified as substituents in $Y^1$ to $Y^2$ may be substituted by halogen atom(s) alkyl group(s), alkoxy group(s), alkoxycarbonyl group(s) or cyano group(s).

In the structural unit represented by the general formula (III) of the invention, there is a double bond between the isosorbide nucleus and the benzene ring, producing geometrical isomers (cis- and trans-isomers) depending on the difference of the configuration. In the structural unit of the general formula (III) of the invention, both cis- and trans-isomers or their mixtures are contained. In this situation, it is preferable to use such a unit that is a trans-isomer before irradiation but converted into a cis-isomer after irradiation in view that it has a high change ratio for the twisting power and can readily be synthesized.

The followings indicate the specific structural units (the units 3-1 to 17 and 4-1 to 4) represented by the general formula (III) of the invention. The units of the invention, however, are not limited to them, and include their geometrical isomers, i.e., cis-isomers.

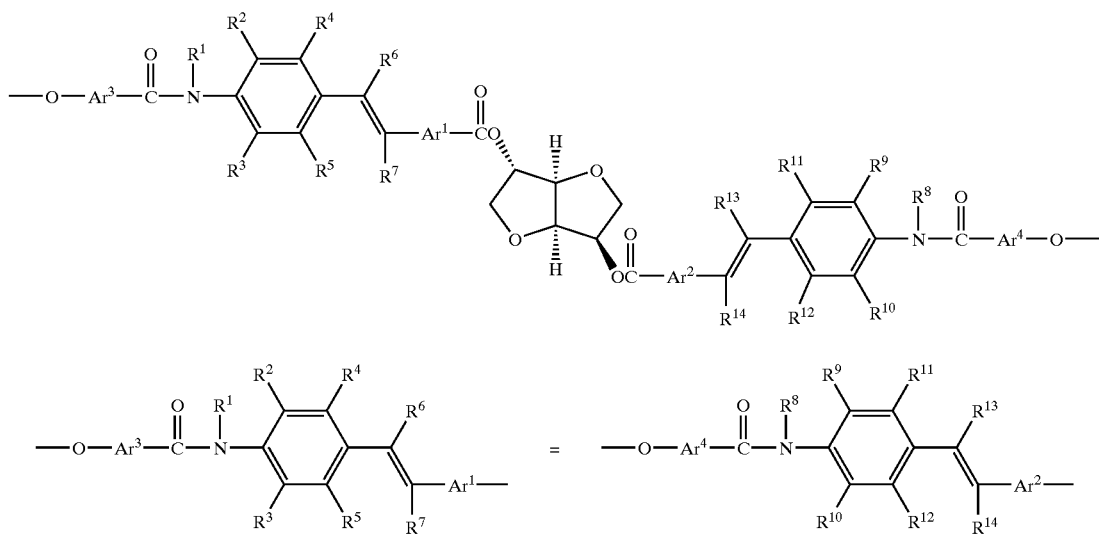

| No. | |
|---|---|
| 3-1 | 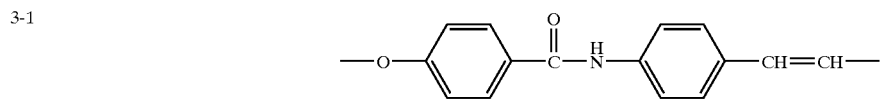 |
| 3-2 | 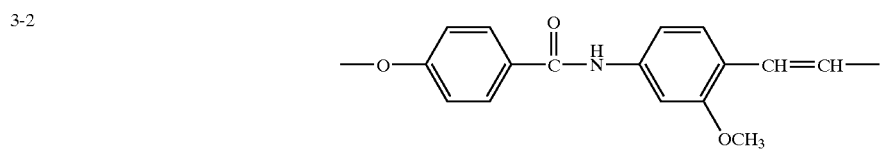 |
| 3-3 | 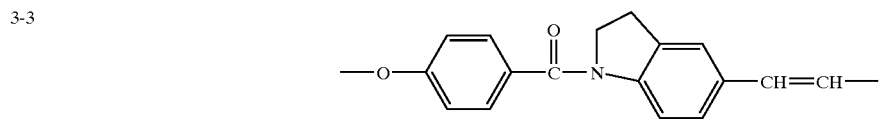 |
| 3-4 | 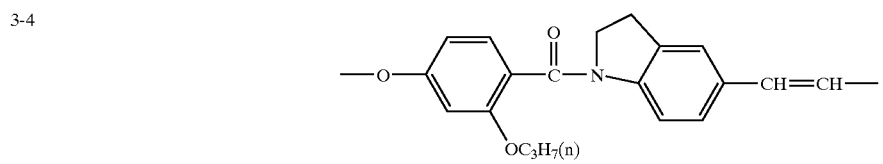 |

-continued
3-5
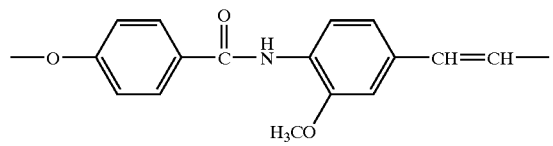
3-6
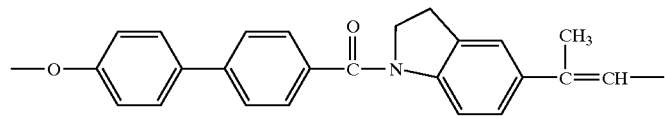
3-7
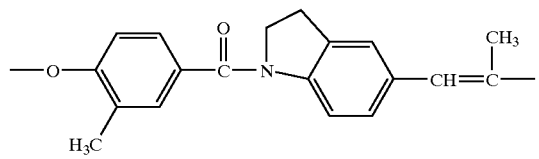
3-8
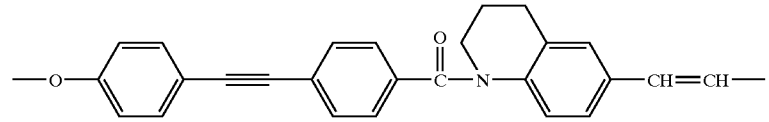
3-9
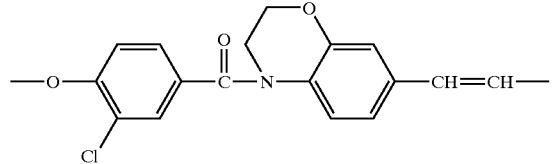
3-10
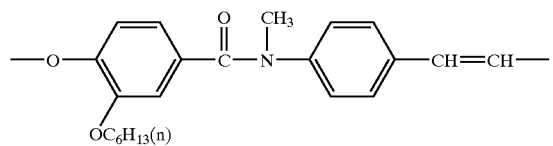
3-11
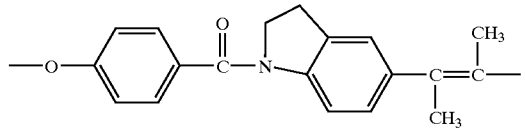
3-12
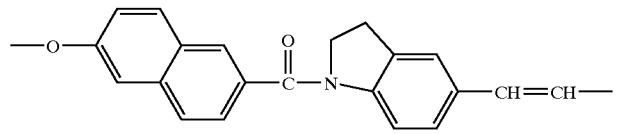
3-13
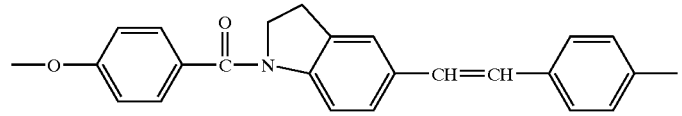
3-14
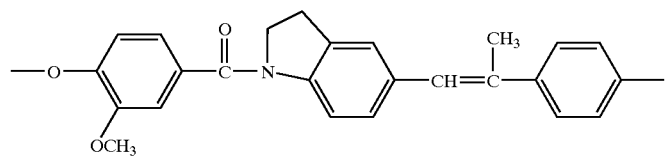

3-15
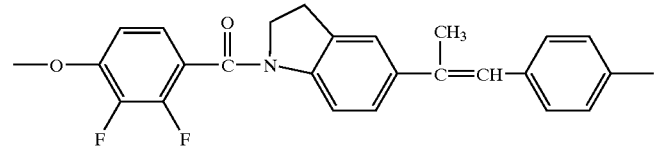
3-16
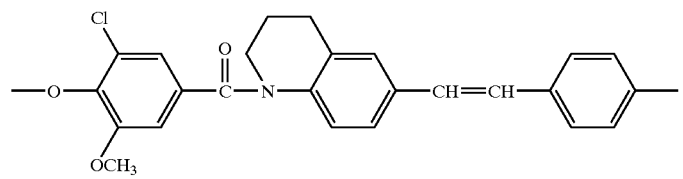
3-17
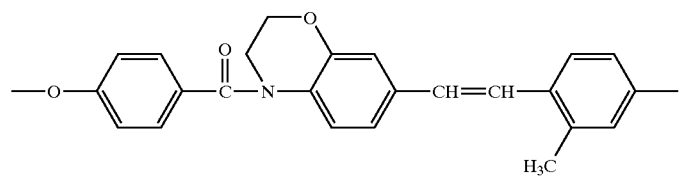
4-1
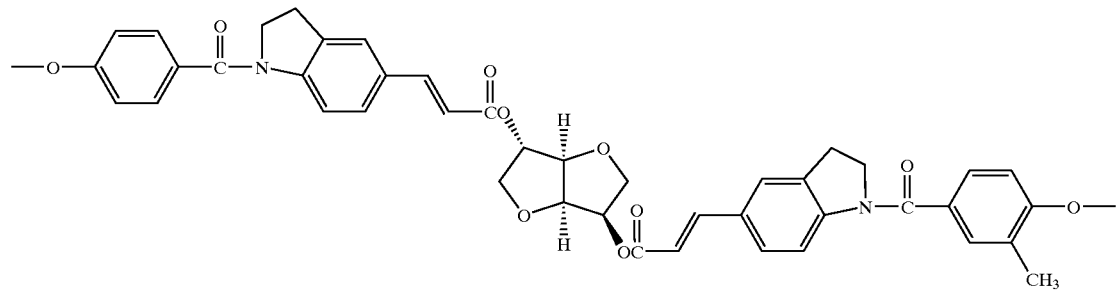
4-2
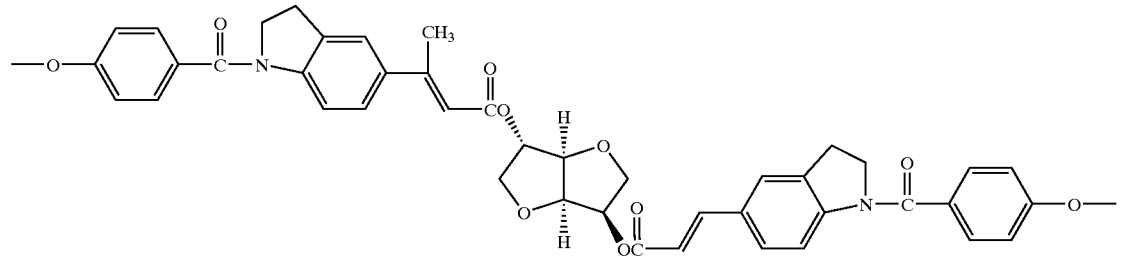
4-3
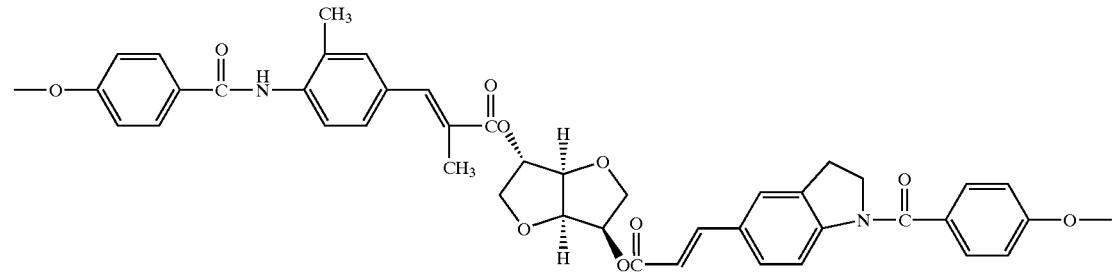

-continued

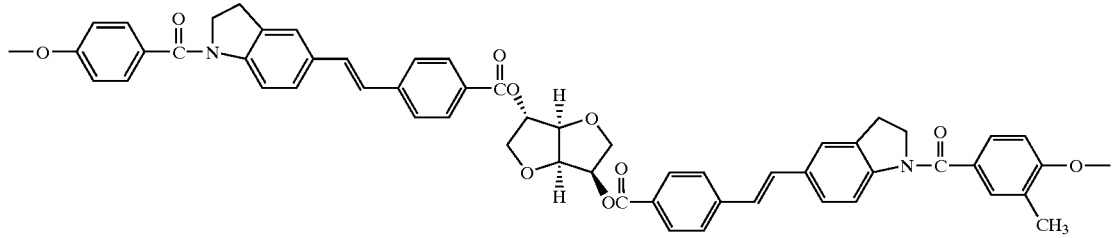

4-4

The Structural Units of the General Formulae (II) and (IV)

Next, the structural units represented by the general formulae (II) and (IV) are explained.

The divalent substituents represented by A preferably has 1 to 40 carbon atoms, particularly a divalent aromatic group having 6 to 40 carbon atoms is preferable. The divalent aromatic group include those having a benzene or naphthalene ring as well as those having a double bond or triple bond conjugated with the aromatic ring. In the general formulae (II) and (IV), when the portion binding to the carbonyl group is an aromatic group, it may be bound through a divalent substituent other than the aromatic group.

In the structural unit of the invention represented by the general formulae (II) and (IV), when A is a divalent aromatic group (hereinafter referred to as aromatic dicarboxylic acid component), the followings (6-1 to 6-6) are preferable, and particularly 6-1, 6-2 and 6-3 are preferable.

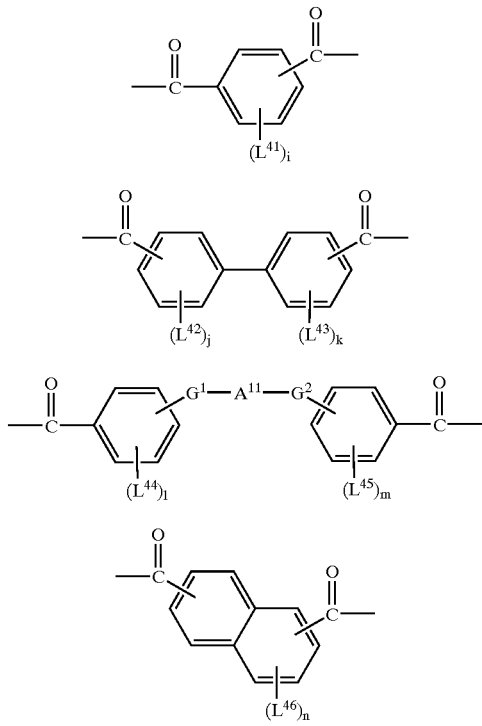

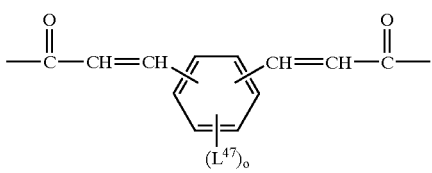

6-5

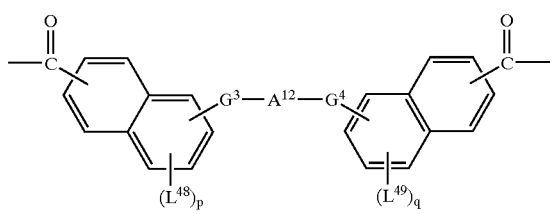

6-6

In the above formulae, $L^{41}$ to $L^{49}$ represent halogen atom, alkyl groups, aryl groups, or alkoxy groups, among which halogen atom, alkyl group and aryl group are preferable, and particularly halogen atom and alkyl group are preferable. The symbols i to g are integers of 0 to 3, particularly 0 is preferable.

In the above formulae, $G^1$ to $G^4$ represent a single bond, —O—, —S—, —O—CO—, —COO—, —O—COO—, —O—CO—N($R^{41}$)—, —N($R^{42}$)—COO—, —N($R^{43}$)—CO—, —CO—N($R^{44}$)—, —N($R^{45}$)—CO—N($R^{46}$)—, among which a single bond, —O—, —O—CO—N($R^{41}$)—, —N($R^{42}$)—COO—, —N($R^{43}$)—CO—, and —N($R^{45}$)—CO—N($R^{46}$)— are preferable, and particularly a single bond, —O— and —N($R^{43}$)—CO— are preferable.

The alkyl groups represented by $R^{41}$ to $R^{46}$ are preferably those having 1 to 12 carbon atoms which may be substituted or unsubstituted by a substituent or substituents, and particularly preferable is an alkyl group having 1 to 8 carbon atoms. When a substituent is used, examples thereof includes, halogen atom, alkoxy group, and aryl group.

In the above formulae, $A^{11}$ and $A^{12}$ independently represent an alkylene group, an alkenylene group, an alkynylene group, or an arylene group, among which an alkylene group, alkenylene group and an arylene group are preferable, and particularly alkylene group and arylene group are preferable.

As specific examples of the structural units represented by the general formulae (II) and (IV), the followings (7-1 to 7-18) are preferable, and particularly 7-1 to 7-8 are preferable.

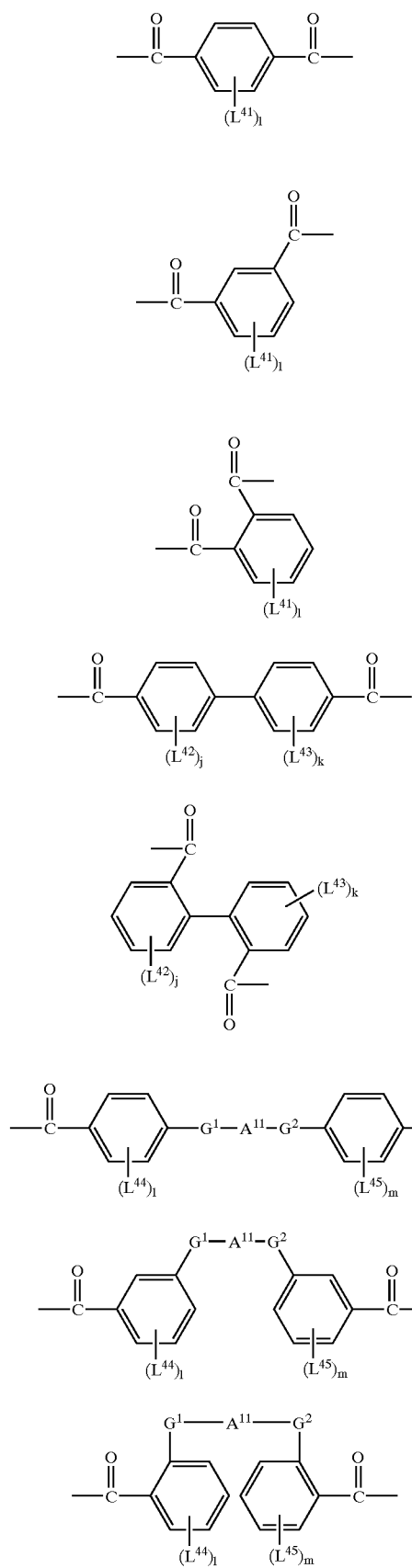
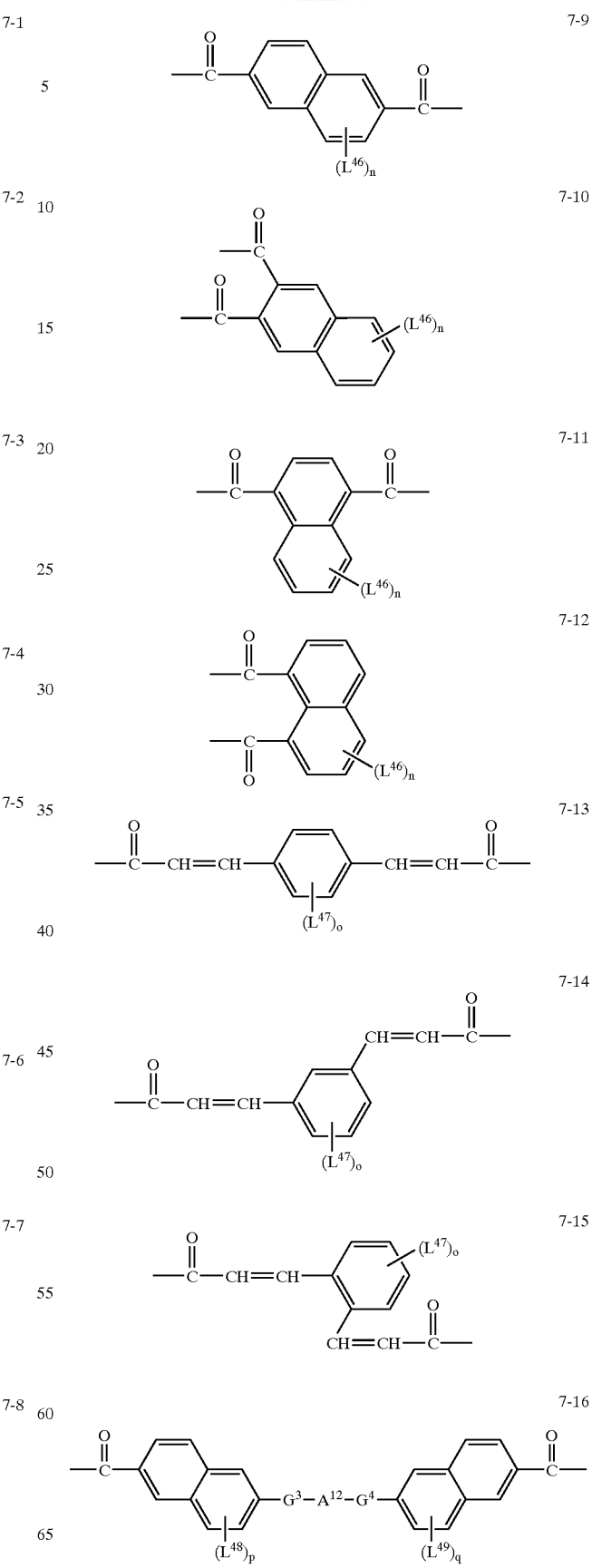

-continued

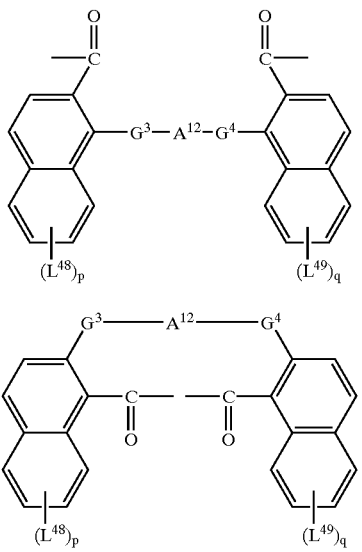

7-17

7-18

In the above formulae, the halogen atoms represented by $L^{41}$ to $L^{49}$ preferably include fluorine atom, chlorine atom and bromine atom, and particularly, fluorine and chlorine atoms are preferable.

In the above formulae, the alkyl groups represented by $L^{41}$ to $L^{49}$ are preferably those having 1 to 12 carbon atoms which may be substituted or unsubstituted by a substituent or substituents, and particularly preferable is an alkyl group having 1 to 8 carbon atoms. When a substituent is used, examples thereof includes, halogen atom, aryl group and alkoxy group.

In the above formulae, the aryl groups represented by $L^{41}$ to $L^{49}$ are preferably those having 6 to 20 carbon atoms which may be substituted or unsubstituted by a substituent or substituents, and particularly preferable is an aryl group having 6 to 15 carbon atoms. When a substituent is used, examples thereof includes, halogen atom, alkyl group and alkoxy group.

In the above formulae, the alkoxy groups represented by $L^{41}$ to $L^{49}$ are preferably those having 1 to 12 carbon atoms which may be substituted or unsubstituted by a substituent or substituents, and particularly preferable is an alkoxy group having 1 to 8 carbon atoms. When a substituent is used, examples thereof includes, halogen atom, aryl group and alkoxy group.

In the above formulae, $A^{11}$ and $A^{12}$ represent divalent connecting groups, for example, alkylene group, alkenylene group, alkynylene group, arylene group, and the like.

The preferable alkylene groups represented by $A^{11}$ and $A^{12}$ in the above formulae are straight or branched chain or cyclic alkylenes having 1 to 28 carbon atoms, particularly alkylene groups having 2 to 20 carbon atoms, which may have a substituent or substituents. The substituent is exemplified by halogen atom, aryl group, alkoxy group, and the like. In this situation, one or non-vicinal two $CH_2$ groups may be replaced by oxygen atom, sulfur atom or $G^1$ group, and the alkylene chain may contain an aryl group.

The preferable alkenylene groups represented by $A^{11}$ and $A^{12}$ in the above formulae are straight or branched chain or cyclic alkenylenes having 2 to 28 carbon atoms, particularly alkenylene groups having 2 to 20 carbon atoms, which may have a substituent or substituents. The substituent is exemplified by halogen atom, aryl group, alkoxy group, and the like.

The preferable alkynylene groups represented by $A^{11}$ and $A^{12}$ in the above formulae are those having 2 to 28 carbon atoms, particularly alkynylene groups having 2 to 20 carbon atoms.

The preferable arylene groups represented by $A^{11}$ and $A^{12}$ in the above formulae are those having 6 to 28 carbon atoms, particularly arylene groups having 6 to 20 carbon atoms. The substituent is exemplified by halogen atom, aryl group, alkoxy group, and the like.

The followings indicate the specific examples of the aromatic dicarboxylic acid components (e.g., Compounds A-1 to A-38) used in the invention. The invention, however, is not limited to these compounds.

A-1
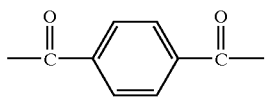

A-2
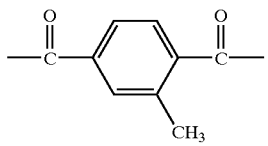

A-3
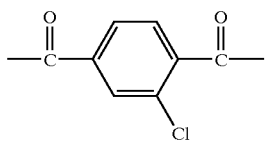

A-4
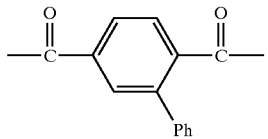

A-5
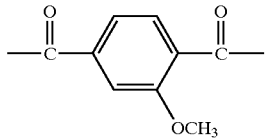

A-6
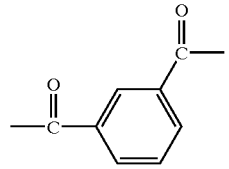

A-7
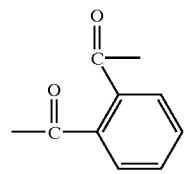

A-8
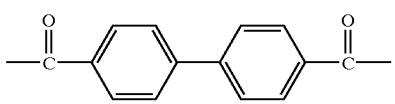

A-9
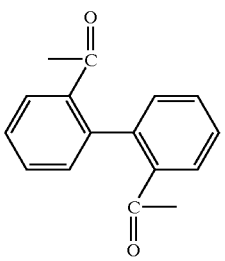
A-10
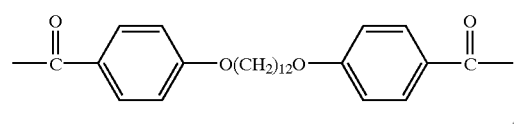
A-11
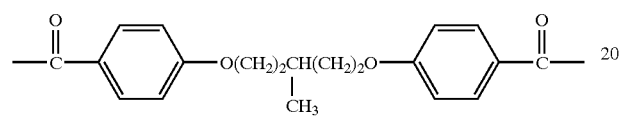
A-12
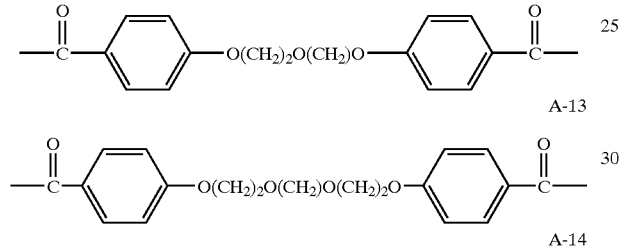
A-13
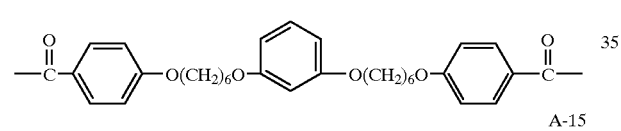
A-14
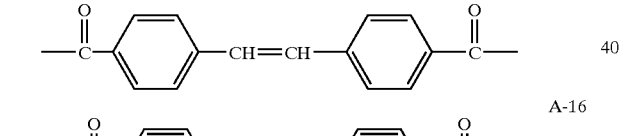
A-15
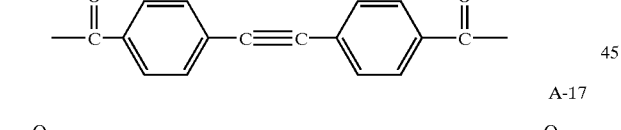
A-16
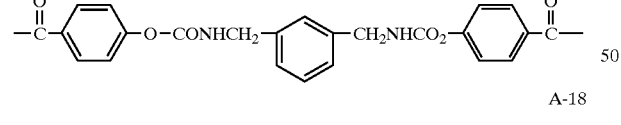
A-17
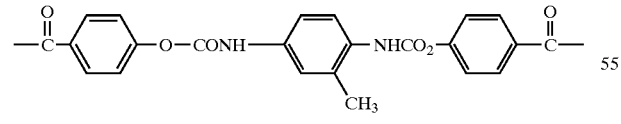
A-18
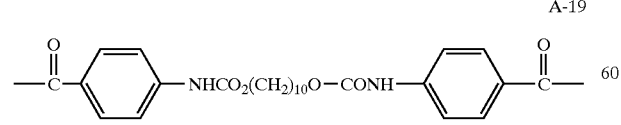
A-19
A-20
A-21
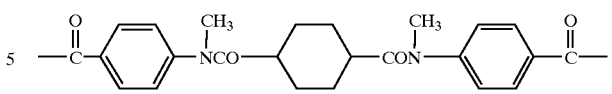
A-22
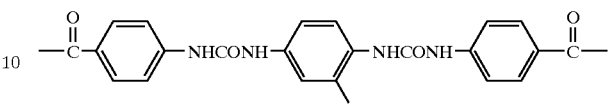
A-23
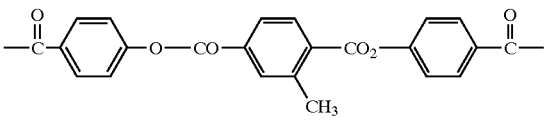
A-24
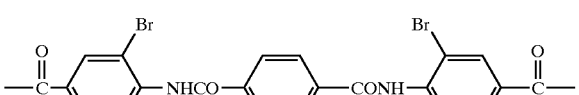
A-25
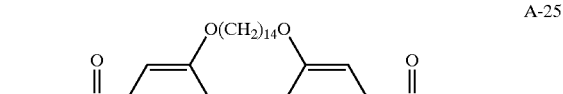
A-26
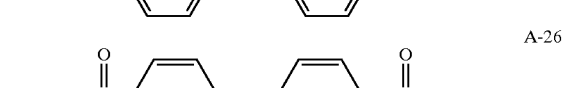
A-27
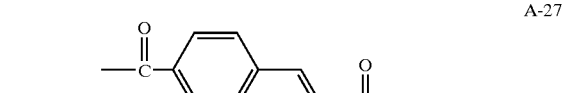
A-28
A-29
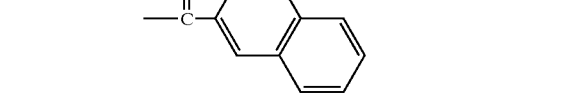
A-30

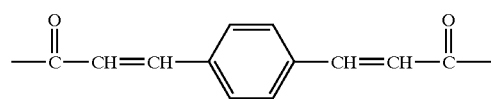
A-31

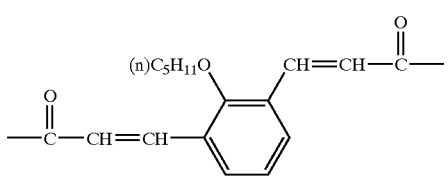
A-32

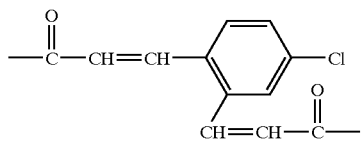
A-33

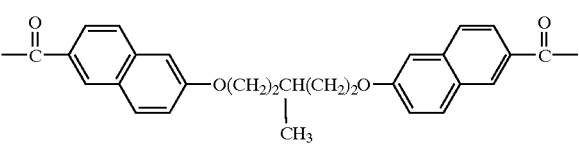
A-34

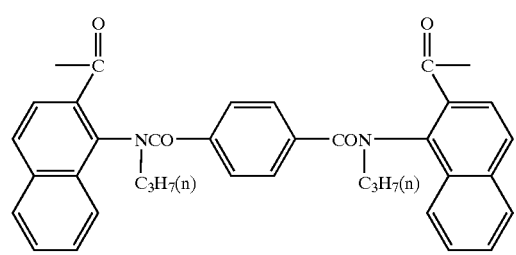
A-35

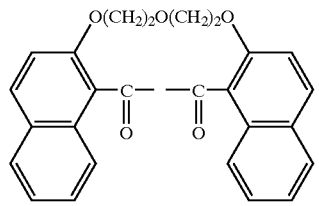
A-36

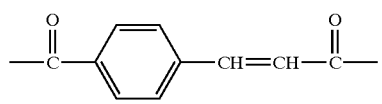
A-37

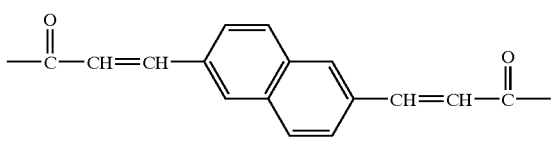
A-38

The structural units represented by the general formulae (II) and (IV) may contain those in which the symbol A in the formulae (II) and (IV) is a divalent aliphatic group (hereinafter referred to as an aliphatic dicarboxylic acid component) alone or together with the above aromatic dicarboxylic acid component. The divalent aliphatic group includes alkylene groups, alkenylene groups, and alkynylene groups.

These alkylene groups, alkenylene groups, and alkynylene groups respectively have the same significance as the alkylene groups, alkenylene groups, and alkynylene groups represented by $A^{11}$ or $A^{12}$.

The followings indicate the specific examples of the aliphatic dicarboxylic acid components (e.g., Compounds B-1 to B-7) used in the invention. The invention, however, is not limited to these compounds.

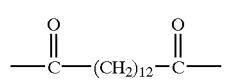
B-1

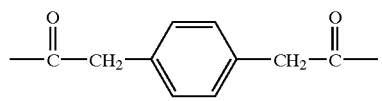
B-2

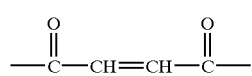
B-3

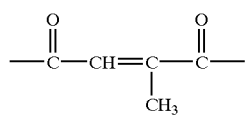
B-4

B-5

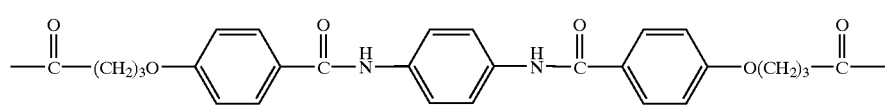
B-6

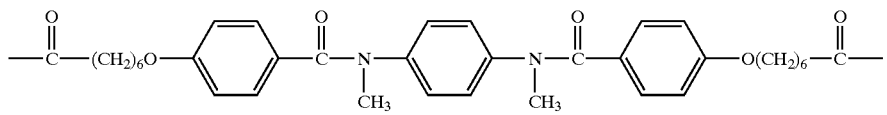

B-7

Syntheses of the Optically Active Polyesteramides

Next, processes for synthesizing the optically active polyesteramides are explained.

The diamines corresponding to the structural units represented by the general formula (I) may be synthesized according to the following reaction scheme.

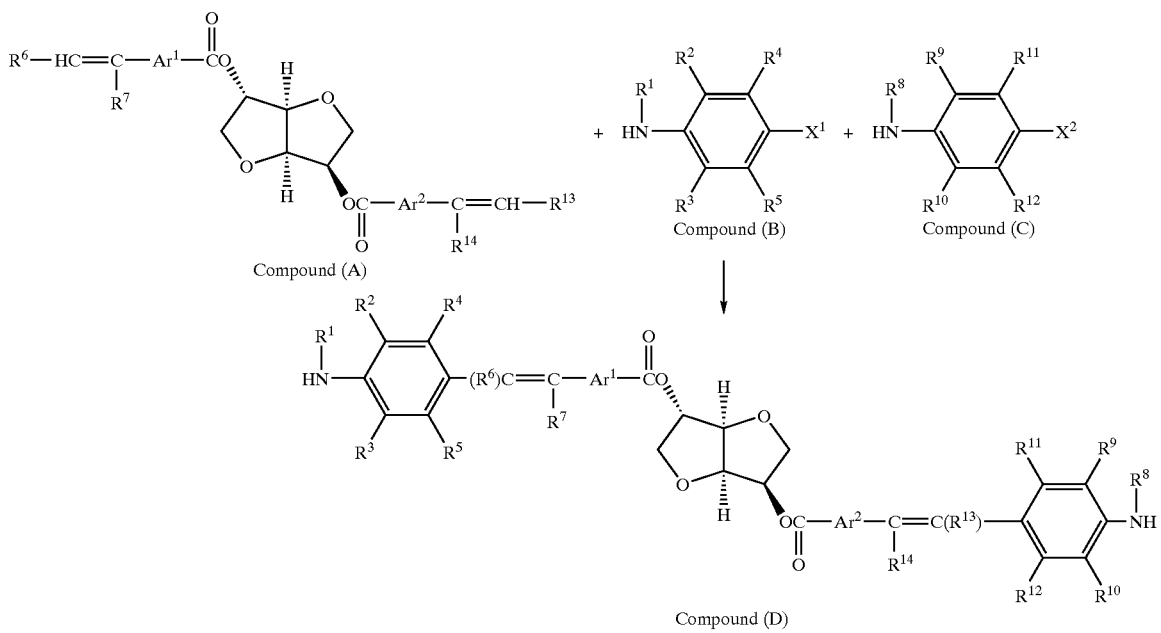

In the above formulae, $X^1$ in Compound (B) and $X^2$ in Compound (C) independently represent halogen atoms, with bromine or iodine being preferable, with iodine being particularly preferable.

In other words, the isosorbide derivatives represented by Compound (D) can be synthesized by coupling reaction of aryl halides with an olefin.

The coupling reaction is preferably carried out in the presence of a transition metal catalyst, base, solvent, and if necessary other additive(s), in order to accelerate the reaction. The coupling reaction may be conducted according to the method as described in details in "*Organic Reactions*", 27, 345 (1982).

In the above reaction, Compound (B) and Compound (C) may preferably be used respectively in an amount of 1.0–5.0 molar equivalent, particularly 1.0–2.0 molar equivalent to Compound (A).

The preferable transition metal catalyst includes a palladium catalyst and nickel catalyst, particularly palladium catalyst.

As for the palladium catalyst, either 0-valent or divalent palladium catalyst may be used, specifically including $Pd(PPh_3)_4$, bis(dibenzylideneacetone)palladium(0), $Pd(OAc)_2$, $PdCl_2$, $PdCl_2(PPh_3)_2$, and the like.

In using a palladium catalyst as a transition metal catalyst as described above, it may be added in an amount of 0.005–0.3 molar equivalent, particularly 0.01–0.2 molar equivalent to Compound (A).

As for the base, either inorganic or organic base may be used, specifically including calcium carbonate, triethylamine, tributylamine, potassium acetate, and the like. The base may preferably be added in an amount of 2.0–10.0 molar equivalent, particularly 2.0–5.0 molar equivalent to Compound (A).

As for the solvent, DMF (dimethylformamide), DMAc (dimethylacetamide), acetonitrile, and toluene, particularly DMF and toluene may preferably be used. The solvent may preferably be used in an amount of 1.0–10 L, particularly 1.0–5.0 L for 1 mole of Compound (A).

The above-mentioned other additive(s) include(s) ligands of phosphine type such as triphenylphosphine, tributylphosphine, 1,2-bis(diphenylphosphino)ethane, 1,3-bis(diphenylphosphino)propane, 1,4-bis(diphenylphosphino)butane, 1,1'-bis((diphenylphosphino) ferrocene, 2,2'-bis((diphenyl-phosphino)-1,1'-binaphthyl, etc.; quaternary ammonium salts such as tetrabutylammonium bromide, tetrabutylammonium chloride, etc.; and metal salts such as nitrate, etc.

The amount of the other additive(s) to be added may preferably be adjusted according to the respective role. For example, a ligand of phosphine type may preferably be added in an amount of 0.01–0.4 molar equivalent, particularly 0.05–0.3 molar equivalent to Compound (A).

The quaternary ammonium salt may preferably be added in an amount of 1.0–5.0 molar equivalent, particularly 2.0–4.0 molar equivalent to Compound (A).

The metal salt may preferably be added in an amount of 1.0–5.0 molar equivalent, particularly 2.0–4.0 molar equivalent to Compound (A).

The reaction may be conducted preferably at a temperature of 20° C. to 200° C., particularly 50° C. to 120° C.

On the other hand, the compounds in which $R^1$ and $R^8$ of the formula (I) represent hydrogen atoms may be synthesized according to the following reaction scheme.

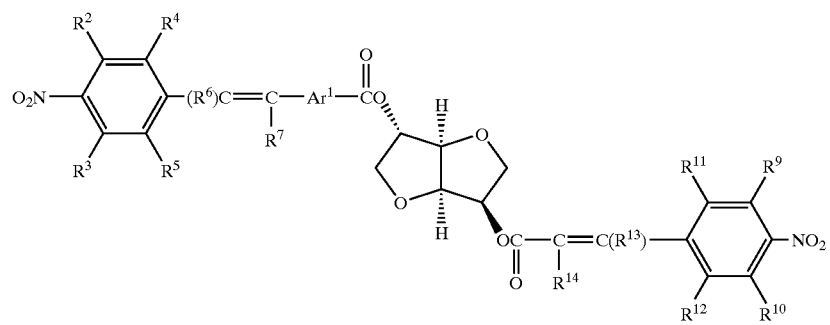

Compound (E)

↓ Reduction

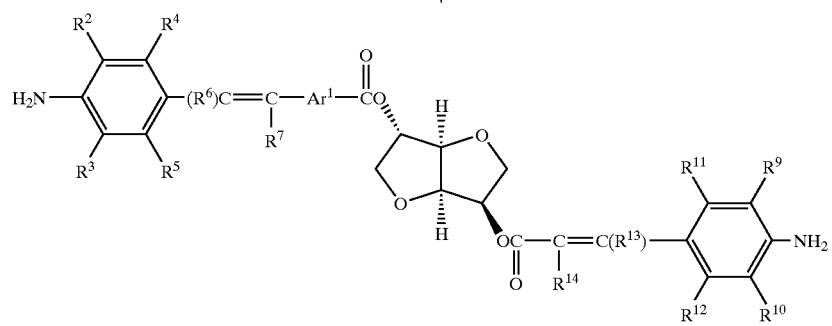

Compound (F)

Compound (E), which is prepared according to the above-mentioned process or by reaction of an isosorbide with a carboxylic acid or carboxylic acid chloride, may be reduced at the nitro group to give Compound (F). The reduction can be achieved according to a known reduction method using iron dust or zinc.

The diols corresponding to the structural units represented by the general formula (III) can be synthesized according to the following reaction scheme.

In the synthetic reaction for the diamines corresponding to the structural units of the general formula (I), Compound (B) and Compound (C) may be replaced by Compound (G) and Compound (H), and otherwise the reaction may be carried out in the same manner as described above to give the diol compounds (I) corresponding to the structural units represented by the general formula (III).

As for the dicarboxylic acids or dicarboxylic acid derivatives corresponding to the structural units represented by the

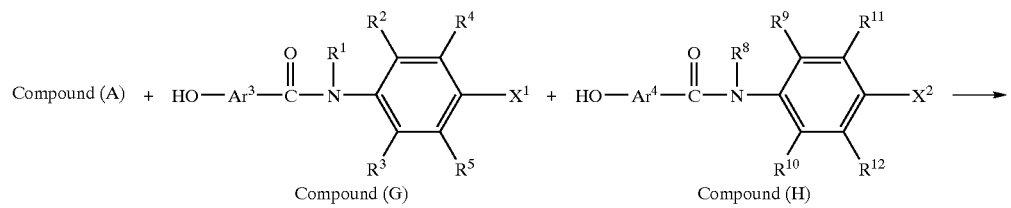

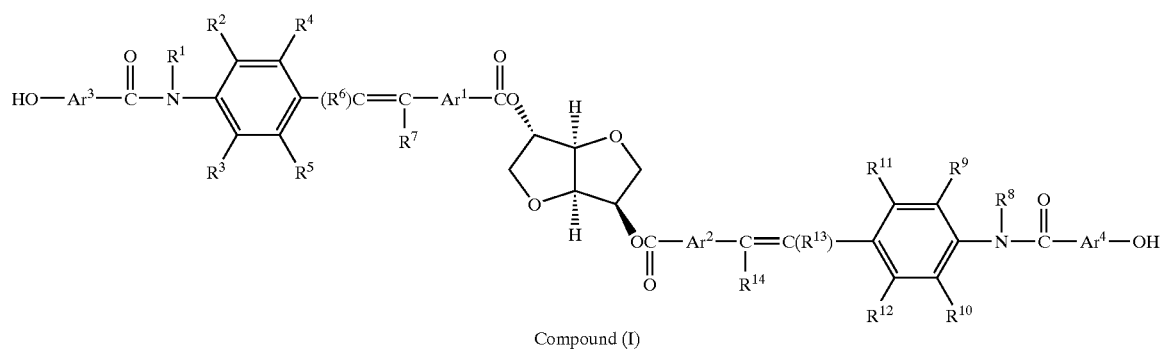

Compound (I)

general formula (II), commercially available ones or conventionally synthesized ones may be used.

In producing the optically active polyesteramides of the invention, the diamines corresponding to the structural units represented by the general formula (I) or the diols corresponding to the structural units represented by the general formula (III) are subjected to polycondensation reaction with the dicarboxylic acids or dicarboxylic acid derivatives corresponding to the structural units represented by the general formula (II) or (III).

In carrying out the polyesterification reaction and polyamidation reaction, it is possible by referring, for example, "Syntheses and reaction of polymers (2): Syntheses of condensed polymers" in "New experimental manual for polymers", vol.3, 77–95 (edited by Society of Polymer Science, Kyoritsu Shuppan Co., Ltd., 1996).

In producing the polyesters or polyamides of the invention, it is preferable to use an acid chloride as an acid component in the polycondensation reaction. In such a case, a base such as triethylamine, pyridine, DBU, and the like may be used.

The reaction may be carried out in a solvent such as THF, DMF, N-methylpyrrolidone, or acetonitrile.

The content of the structural units represented by the general formula (I) or (III) may be chosen properly depending on the desired HTP, molecular weight, solubility, etc., and is preferably 10 to 90 mole %, particularly 20 to 80 mole %, for the whole constituents.

The molar ratio of the diamine or diol component of the structural unit represented by the general formula (I) or (III) to the dicarboxylic acid (derivative) of the structural unit represented by the general formula (II) or (III) used in the reaction is preferably 80/20 to 20/80 as (diamine or diol component)/(dicarboxylic acid component), particularly 70/30 to 30/70.

Photoreactive Chiral Agents

The photoreactive chiral agents of the invention comprise optically active polyesteramides having the structural units represented at least by the general formulae (I) and (II) or by the general formulae (III) and (IV). The chiral agents are able to control the orientation structure of liquid crystal compounds and to isomerize the structure by irradiation to change the helical pitch of liquid crystals, i.e., helical twisting power (HTP). In other words, the reagents are the compounds that can cause the change in helical twisting power induced in a liquid crystal compound, preferably nematic liquid crystal compound, by irradiation (ultraviolet—visible—infrared ray). Such compounds have as necessary sites (molecular structure unit) a chiral site and a structurally changeable site by irradiation.

In addition, the photoreactive chiral agents comprising the optically active polyesteramides of the invention particularly are able to change significantly the HTP of liquid crystal molecules. Therefore, for example, in a case of cholesteric liquid crystals (liquid crystal phase) using a nematic liquid crystal compound as a liquid crystal compound, the selective reflection becomes possible in a wide range of wavelength including primaries of B (blue), G (green) and R (red). That is, the selective reflection of the wavelength of light is determined by the helical twisting power of liquid crystal molecule, and as the angle changes greatly, the color range of the selective reflection is extended practically.

The above-mentioned HTP indicates the helical twisting power, that is, HTP=1/(pitch×the concentration of the chiral agent [mass percentage]). For example, a helical pitch (one cycle of helical structure; $\mu$m) of a liquid crystal molecule is measured at a certain temperature, and the value can be calculated from the concentration of a chiral agent [$\mu m^{-1}$].

When the selective reflection color is formed with a photoreactive chiral agent depending on the illumination, the rate of HTP change (=HTP before irradiation/HTP after irradiation) is preferably 1.5 or more, more preferably 2.5 or more where HTP decreases after irradiation, or 0.7 or less, more preferably 0.4 or less where HTP increases after irradiation.

The photoreactive chiral agents of the invention may be used in combination with a photo-unreactive known chiral agent of which the twisting power largely depends on temperature.

The photo-unreactive known chiral agent includes those disclosed in JP-A No.2000-44451, JP-B Nos.10-509726, 2000-506873 and 9-506088, WO98/00428, and "Liquid Crystals" No.21, 327 (1996), and No. 24, 219 (1998).

Liquid Crystal Compositions

The liquid crystal compositions of the invention comprise at least one liquid crystal compound (preferably, nematic liquid crystal compound) and at least one compound selected from the above-mentioned optically active polyesteramides (that is, photoreactive chiral agents), wherein the liquid crystal compound may contain a polymerizable group.

The compositions if required may contain other components such as polymeric monomer, polymerization initiator, binder resin, solvent, surface-active agent, polymerization inhibitor, thickener, dyestuff, pigment, ultraviolet ray absorbent, and gelling agent. The liquid crystal composition of the invention may preferably be used in combination with a surface active agent. For example, when a liquid crystal composition in a liquid state for coating is applied to form a coating layer, the orientation of liquid crystal molecules in the air interface on the surface of layer can be controlled sterically, and particularly in a cholesteric liquid crystal phase, it is possible to obtain a selective reflection wavelength in high color purity and in good resolution.

Optically Active Polyesteramides

The above-mentioned optically active polyesteramides contain as photoreactive chiral agents those having at least the structural units represented by the general formulae (I) and (II) or by the general formulae (III) and (IV), and they work to sterically control the orientation structure of liquid crystal molecules and change the helical structure of the coexisting liquid crystal compound, preferably, a nematic liquid crystal compound, on irradiation in a desired pattern and quantity of light.

There is no particular limitation in the content of the optically active polyesteramides (photoreactive chiral agents), but it may be chosen properly in a range of 0.1 to 30% by weight for the total solid components (mass) of liquid crystal composition.

Liquid Crystalline Compounds

The liquid crystalline compounds may be selected from compounds of which the refractive index anisotropy $\Delta n$ is 0.10–0.40, including liquid crystal compounds, macromolecular liquid crystal compounds, and polymeric liquid crystal compounds. For example, smectic liquid crystal compounds and nematic liquid crystal compounds are exemplified, among which the nematic liquid crystal compounds are preferable. For example, a nematic liquid crystal compound is used as a liquid crystalline compound in combination with an optically active polyesteramide having the structural units represented by the general formulae (I)

and (II) or by the general formulae (III) and (IV) to give a cholesteric liquid crystal composition (cholesteric liquid crystal phase).

The above-mentioned liquid crystal compounds can be oriented, during a melting liquid crystal state, on an oriented substrate which has been treated for orientation, for example, by rubbing processing. When a liquid crystal state is fixed at a solid phase, such a technique as cooling, polymerization, etc. may be employed.

The following compounds are specific examples of the liquid crystalline compounds. The invention, however, is not limited to these compounds.

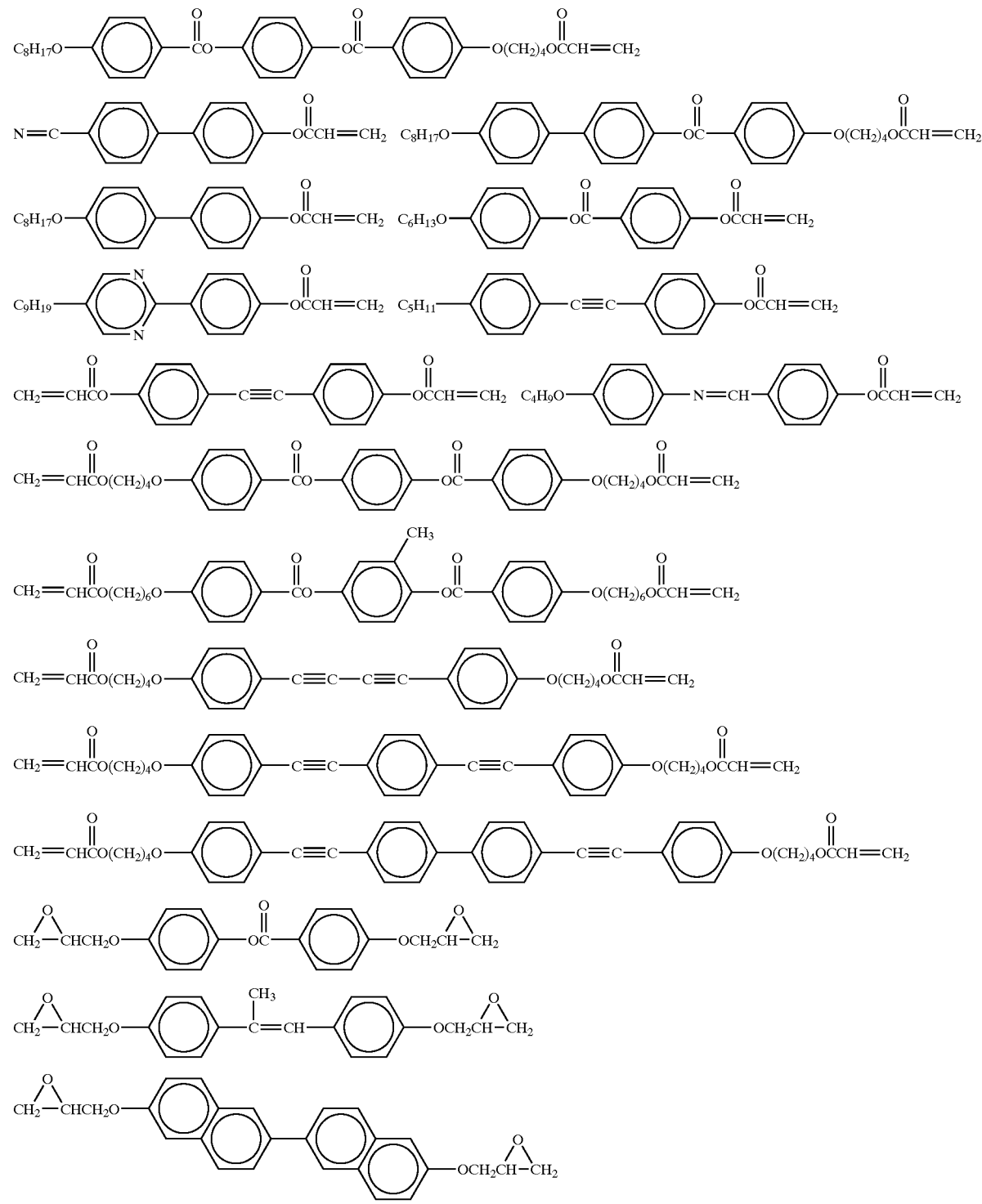

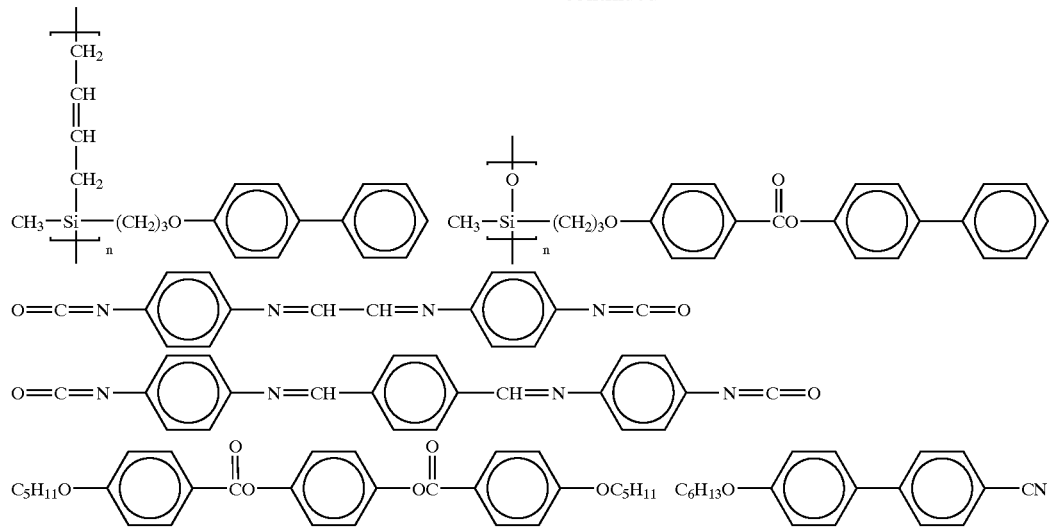

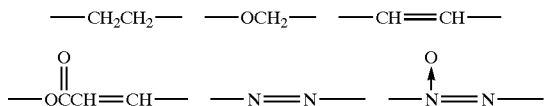

In the above formulae, n indicates an integer of 1 to 1000.

In addition to the compounds as exemplified above, the compounds in which the aromatic rings are replaced by the following connecting groups are also exemplified as preferable compounds.

Among the above-mentioned compounds, in view of ensuring sufficient cure and improving heat resistance of the layer, the liquid crystal compounds that have a polymerizing or bridging group are preferable.

The content of the liquid crystalline compound is preferably in a range of 30 to 99.9% by weight, more preferably in 50–95% by weight, for the total solid components (mass) of liquid crystal composition. The content less than 30% by weight sometimes makes the orientation unsatisfactory, and particularly in the cholesteric liquid crystals the desired selective reflection color could not be obtained in some cases.

Photopolymerization Initiators

In the liquid crystal compositions of the invention, it is possible to incorporate a photopolymerization initiator. The combined use of a photopolymerization initiator is effective in accelerating the polymerization reaction of the polymerizing group, fixing the helical structure after alteration of the helical pitch (twisting power) of liquid crystal by irradiation, and further elevating the strength of the liquid crystal composition after fixation. When a polymerization reaction of a polymerizing liquid crystalline compound is utilized in fixation of the liquid crystal helical structure, it is appropriate to add a photopolymerization initiator.

For example, when the liquid crystal phase is of a cholesteric liquid crystal, a desired helical pitch can be obtained stably, and a selective reflection color can be attained in high color purity and in high resolution.

The photopolymerization initiators can be chosen properly from the conventional ones, for example, p-methoxyphenyl-2,4-bis(trichloromethyl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphate, and the like. In addition, bisacylphosphine oxides such as bis(2,4,6-trimethylbenzoyl)phenylphosphine oxide, disclosed in JP-A No.10-29997, and acylphosphine oxides such as Lucirin TPO disclosed in DE 4230555, are included.

The content of the photopolymerization initiator is preferably in a range of 0.1 to 20% by weight, more preferably in 0.5–5% by weight, for the total solid components (weight) of liquid crystal composition. The content of less than 0.1% by weight sometimes requires much time for cure because of low curing rate. The content exceeding 20% by weight in some cases lowers the light transmittance in a range of from ultraviolet to visible ray.

As described above, the liquid crystal compositions of the invention comprise an optically active polyesteramide having at least the structural units represented by the general formulae (I) and (II) or by the general formulae (III) and (IV), and a photopolymerization initiator. The optically active polyesteramide is isomerized (trans-cis) by light to make the helica pitch of the liquid crystal change, and the photopolymerization initiator works to accelerate the polymerization reaction of the polymerizing group. Thus, it is preferable that the optically active polyesteramide and the photopolymerization initiator respectively have a mutually different range of photosensitive wavelength. The mutually different range of photosensitive wavelength means that both central sensitive wavelengths do not overlap each other, that is, the orientation of liquid crystal is not changed at the time of exposure as visual imagery or during cure by polymerization so that the characters of displaying visual imagery, hue purity by the selective reflection and resolution are not decreased. In order to avoid overlap of the central sensitive wavelength, in addition to changes of both molecular structures, the wavelength of irradiation ray may be controlled by passing through a band-pass filter.

Thus, both compounds are exposed to mutually different wavelength (sensitization) by irradiation as visual imagery to orient the liquid crystal molecules in a pattern state, and then fixed without affecting on the helical pitch of the liquid crystal oriented in a pattern state to give an image composed of the desired helical pitch. For example, when the liquid crystal phase is of cholesteric liquid crystal, the hue superior in color purity and in resolution can be obtained based on the selective reflection color composed of the desired helical pitch.

Polymerizing Monomers

The liquid crystal compositions of the invention may be used in combination with a polymerizing monomer in order to improve the degree of curing such as the film strength. The combined use of the polymerizing monomer is effective in fixation of the helical structure (selective reflectivity) after the change (patterning) of twisting power of the liquid crystal by irradiation and enhancement of the strength of liquid crystal composition after fixation. When the liquid crystalline compound has a polymerizing group within the same molecule, however, it is not necessarily added.

The polymerizing monomers are exemplified by those having an ethylenic unsaturated linkage, specifically multi-functional monomers such as pentaerythritol tetraacrylate, dipentaerythritol hexaacrylate, and the like.

The monomers having an ethylenic unsaturated linkage are specifically exemplified by the following compounds. The invention, however, is not limited to these compounds.

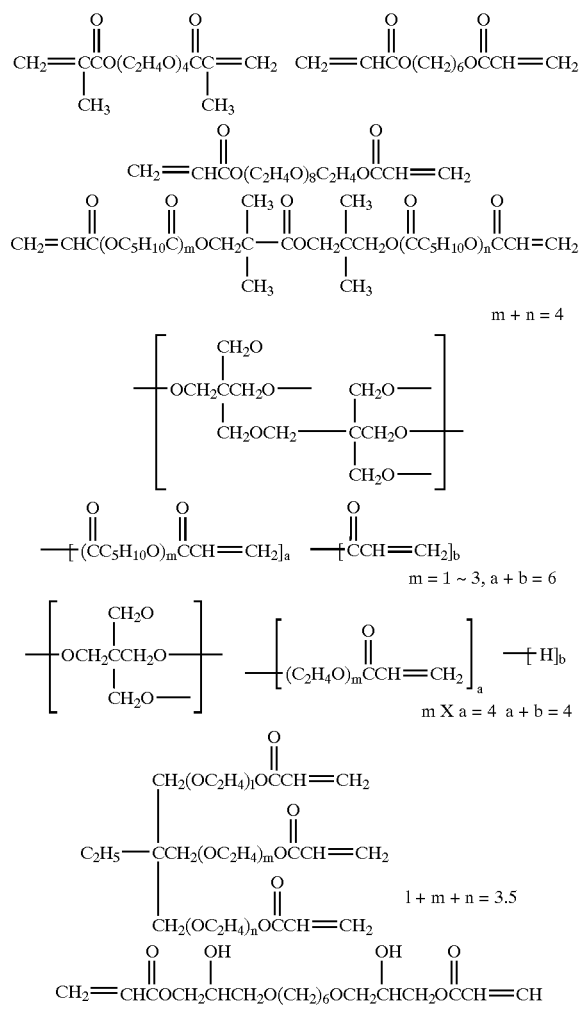

The polymerizing monomer may be used in an amount of 0.5–50% by weight for the total solid component (by weight) of liquid crystal composition. The amount of less than 0.5% by weight gives no sufficient curing in some cases, and the amount over 50% by weight sometimes disturbs the orientation of the liquid crystal molecule to give no satisfactory color.

Other Components

In addition, the other components such as binder resin, solvent, surface-activate agent, polymerization inhibitor, thickener, dyestuff, pigment, ultraviolet ray absorbent, and gelling agent may be added.

The binder resin includes, for example, polystyrene compounds such as polystyrene and poly-α-methylstyrene; cellulose resins such as methylcellulose, ethylcellulose, and acetylcellulose; acidic cellulose derivatives having carboxyl groups on the side chains; acetal resins such as polyvinyl formal and polyvinyl butyral; methacrylic acid copolymers, acrylic acid copolymers, itaconic acid copolymers, crotonic acid copolymers, maleic acid copolymers and partially esterified maleic acid copolymers as described in JP-A No.59-44615, JP-B Nos. 54-34327, 58-12577, 54-25957, JP-A Nos. 59-53836 and 59-71048.

The homopolymers of alkyl acrylates and of alkyl methacrylates are also included, in which the alkyl group is methyl, ethyl, n-propyl, n-butyl, iso-butyl, n-hexyl, cyclohexyl, or 2-ethylhexyl.

In addition, hydroxyl-containing polymers to which is added an acid anhydride, benzyl (meth)acrylate/(homopolymer of methacrylic acid)acrylic acid copolymer, and benzyl (meth)acrylate/(meth)acrylic acid/other monomer multiple copolymers, are included.

The content of the binder resin in the liquid crystal composition is preferably in a range of 0–50 wt %, more preferably 0–30 wt %. The content over 50 wt % results in insufficient orientation of the liquid crystal compound.

In the liquid crystal compositions of the invention, it is preferable to use a surface active agent together with the photoreactive chiral agent and liquid crystal compound. As the surface active agent, those having an excluded volume effect are preferable. The agents having an excluded volume effect means that, for example, when a layer containing a liquid crystal composition is formed by coating, the spatial orientation in the air interface on the surface of layer can be controlled sterically. More particularly, since a non-ionic surfactant is preferably used, the agent to be used may properly be chosen from so far known non-ionic surface active agents.

The above-mentioned polymerization inhibitor is added in order to improve shelf life. For example, the inhibitor includes hydroquinone, hydroquinone monomethyl ether, phenothiazine, benzoquinone, and their derivatives. The amount of the polymerization inhibitor to be added is preferably in 0–10 wt %, more preferably 0–5 wt % for the polymerizing monomer.

The liquid crystal compositions of the invention can be prepared by dissolving or dispersing the respective components as described above in a proper solvent. In using, this is formed into an optional shape or formed on a support. The solvent includes, for example, 2-butanone, cyclohexanone, methylene chloride, chloroform, and the like.

Method for Changing the Helical Structure of Liquid Crystals

As described above, the liquid crystal composition of the invention comprises a photoreactive chiral agent (optically active polyesteramide of the invention). In the method for changing the helical structure of liquid crystals of the invention, the liquid crystal composition of the invention is irradiated with a desired quantity of light in a desired pattern to change the helical pitch (twisting power) of the liquid crystal to form a region in which the degree of the helical structure, i.e., helical twisting, (twisting power; HTP).

Particularly, when the liquid crystal phase is of cholesteric liquid crystal, it is possible to change optionally the selective reflection color which is displayed by liquid crystal depending on its twisting power. When the rate of change in twisting power (the rate of twisting change) is increased, the width of the selective reflection color selected by liquid crystal is extended, allowing obtaining the selective reflection in a wide range of wavelength including the primary colors (B, G, and R). This is particularly important in displaying the primaries BGR in high color purity and in high resolution. In this regard, since the optically active polyesteramides of the invention are able to change considerably the helical twisting power of liquid crystal, the liquid crystal composition containing the compound (chiral agent) allows to display a wide range of hue including the primaries, blue (B), green (G) and red (R). The resulting primary colors are excellent in color purity and in resolution.

Specifically, the operation may be made as follows.

When a liquid crystal composition is irradiated with light at a certain wavelength, the coexisting photoreactive chiral agent (the optically active polyesteramide of the invention) is exposed to the light to change the helical structure (twisting angle) of liquid crystal according to the intensity of the light to form an image-like pattern (patterning). In the cholesteric liquid crystal composition, this structural change causes a display of different selective reflection color. Therefore, if the irradiation intensity is changed in the individual desired regions, the orientation will occur corresponding to the intensity of irradiation (displaying multicolor). For example, when exposure is made through a mask for exposure which is prepared by changing the photo transmittance as visual imagery, an image formed by one irradiation can be concurrently formed in a colored region of different selective reflection.

Additionally, the helical pitch of liquid crystal can be changed greatly by the optically active polyesteramide of the invention, and therefore in the cholesteric liquid crystal composition, the formed colored region displays a wide range of selective reflection colors to form the BGR primaries excellent in color purity and resolution. The irradiation may be conducted with no particular limitation by means of an exposure mask as well as by changing the irradiation intensity in the individual desired regions.

In forming a liquid crystal color filter or optical film as mentioned below, a liquid crystal composition is irradiated, as described above, with light at a certain wavelength as visual imagery for patterning, and further irradiation photopolymerizes and cures the polymerizing group in liquid crystal composition to fix the helical structure of liquid crystal to the desired selective reflection color. The method for formation is explained in the "Method for fixation of the helical structure of liquid crystals" as described below.

As for the light source used in irradiation, those generating ultraviolet ray are preferably used in view that they are high energy sources and bring about rapid conversion of the structure and rapid polymerization in liquid crystal compounds. For example, a high pressure mercury lamp, metal halide lamp, Hg—Xe lamp, and the like can be employed. It is preferable for the light source to have a light-quantity variable function.

As described above, when an optically active polyesteramide having the structural units represented at least by the general formulae (I) and (II) or by the general formulae (III) and (IV) is incorporated as a chiral agent into a liquid crystal composition, the helical pitch (twisting power) of liquid crystal can be changed greatly responding to the quantity of light. Therefore, for example, in the cholesteric liquid crystal phase using a nematic liquid crystal compound as a liquid crystal compound, the width of selective reflection color displayed by liquid crystal is extended to give the primaries of blue (B), green (G) and red (R) excellent in color purity and resolution.

As already mentioned, by using an optically active polyesteramide having the structural units represented at least by the general formulae (I) and (II) or by the general formulae (III) and (IV), optical films such as a liquid crystal color filter, circularly polarizing separation film, stereoscopic eyeglasses, and polarizing mask can be produced, utilizing the high change ratio of helical pitch caused by said compound and induced by irradiation to the liquid crystal. It can also be applied to a broadband switchable mirror, optically writable recording media, etc. Thus, strong dielectric liquid crystals, counter strong dielectric liquid crystals, patterning of polarization caused by doping to TGB phase, and patterning of the helical pitch are allowed. Naturally, the compounds can be used as usual optically active polyesteramides, and further applied to helical inducers in STN elements or TN elements.

The liquid crystal compositions of the invention may also be used in combination with a photo-isomerizing compound of achiral azo-type or styrene-type, in order to further enhance the change ratio of helical pitch at irradiation.

Method for Fixation of the Helical Structure of Liquid Crystals

As described above, irradiation of a certain wavelength of light to an optically active polyesteramide (photoreactive chiral agent) having the structural units represented at least by the general formulae (I) and (II) or by the general formulae (III) and (IV) changes the twisting power of the coexisting liquid crystal to change the helical structure. According to one embodiment, the liquid crystal composition of the invention comprises a liquid crystal compound having polymerizing groups, a photopolymerization initiator, and at least one of optically active polyesteramides having the structural units represented at least by the general formulae (I) and (II) or by the general formulae (III) and (IV). In the method for fixation of the helical structure of liquid crystal in the invention, the changed helical structure can be fixed by polymerizing the liquid crystal compound; thus, the strength of the liquid crystal composition can further be enhanced after fixation. In this situation, it is appropriate to use a photopolymerization initiator and an optically active polyesteramide of which the photo-sensitive wavelength ranges are different each other.

Specifically, the operation may be made as follows.

In the same manner as in the patterning as explained in "Method for changing of the helical structure of liquid crystals", irradiation is conducted as visual imagery with light in a photosensitive wavelength region of the optically active polyesteramide contained in the liquid crystal composition. By this irradiation, the optically active polyesteramide is exposed to light to cause change of the helical structure of liquid crystal to form an image-like pattern (patterning). After this patterning, irradiation is conducted at the photosensitive wavelength region of the photopolymerization initiator contained in the liquid crystal composition. Thus, the liquid crystal compound is polymerized with the photopolymerization initiator and fixed in a state maintaining the helical structure after change. Prior to this operation, a step for substitution with nitrogen may be added.

When the photosensitive wavelength region of the optically active polyesteramide is different from that of the photopolymerization initiator, the irradiation for changing HTP and that for photopolymerization are not influenced each other. Accordingly, in exposure as visual imagery for changing HTP, the photopolymerization does not proceed to give a patterning of the change ratio of HTP as predetermined. On the other hand, in the photopolymerization for fixation of the helical structure, as the optically active polyesteramide does not react to light, the pattern formed by HTP change is firmly fixed.

In producing a liquid crystal color filter or optical film as mentioned below, the composition is irradiated as visual imagery for patterning with light at the wavelength to which the optically active polyesteramide reacts as mentioned above, and then further irradiated at the wavelength to which the photopolymerization initiator reacts to cure the polymerizing groups in the liquid crystal composition; thus, the helical structure of liquid crystal is fixed to the desired selective reflection color. The method for formation will be described in details below.

As for the light source used in irradiation, the same ones as exemplified in "Method for changing the helical structure of liquid crystals" can be used.

Hereinafter, liquid crystal color filters, optical films, and recording media are explained in details.

Liquid Crystal Color Filters

The liquid crystal color filter of the invention comprises a liquid crystal compound and at least one optically active polyesteramide of the invention as described above, and as the liquid crystal compound a nematic liquid crystal compound is most preferable. If required, it may contain a polymerization monomer, photopolymerization initiator, other components exemplified in the liquid crystal compositions of the invention, and a surface active agent having an excluded volume effect.

For example, it may be irradiated in a desired pattern and quantity of light properly determined on the basis of "Method for changing the helical structure of liquid crystal" and "Method for fixation of the helical structure of liquid crystal" as described above.

The liquid crystal color filters of the invention will be demonstrated in details through the following explanation of the method for producing liquid crystal color filters.

The liquid crystal color filter of the invention may be produced with a composition properly selected from the liquid crystal compositions of the invention and known compositions, particularly form the compositions containing at least an optically active polyesteramide having the structural units represented by the general formulae (I) and (II) or by the general formulae (III) and (IV).

In this case, the filter may be in a sheet shape composed of the liquid crystal composition alone, or in a form in which a layer containing the liquid crystal composition (liquid crystal layer) is placed on a desired support or temporary support. Further, an additional layer (film) such as orientation film or protective film may be placed thereon. In the latter case, 2 or more of the liquid crystal layers may be laminated thereon, and in such a case, the above-mentioned exposure step is repeated several times as mentioned below.

As the nematic liquid crystal compound, polymerizing monomer, photopolymerization initiator, and other components, the same components as those usable in the liquid crystal compositions of the invention may be used, and the content of them and the preferable range are also the same as in the liquid crystal compositions. It is appropriate to use a surface active agent having an excluded volume effect.

In the liquid crystal compositions constituting the liquid crystal color filters, the content of the optically active polyesteramide having the structural units represented at least by the general formulae (I) and (II) or by the general formulae (III) and (IV) is also the same as in the liquid crystal compositions of the invention.

The liquid crystal color filters of the invention may be produced, for example, with the liquid crystal compositions of the invention.

There is no particular limitation in a method for producing the liquid crystal color filters. For example, the method comprises the patterning by exposure as visual imagery with the first light and the subsequent photo-polymerization and curing with the second light (hereinafter sometimes referred to as "exposure step"); the latter step is involved at least one time. That is, the above-mentioned "Method for fixing the helical structure of liquid crystal" of the invention may be applied. The liquid crystal color filters may be produced depending on the selected production embodiment through a step of orientation processing for the interface contacting to the liquid crystal composition (orientation processing step), a step for transcription of the liquid crystal layer by adherence and delamination (transcription step), a step for forming a liquid crystal layer by coating of a cholesteric liquid crystal composition (coating step), and the like.

The followings are one specific example of production involving the exposure step, wherein a cholesteric liquid crystal composition is used.

Exposure Step

In the exposure step, the patterning and fixation (polymerization curing) of the liquid crystal compound are achieved by irradiation.

The patterning is carried out by exposure as visual imagery with the first light at the wavelength to which the optically active polyesteramide (hereinafter sometimes referred to as "photoreactive chiral agent") reacts in high sensitivity. Subsequently, the fixation is carried out by photopolymerization with the second light at the wavelength to which the polymerization initiator reacts in high sensitivity to cause curing. Thus, the helical structure of the liquid crystal compound is fixed to the desired selective reflection color.

When the first light is irradiated to the liquid crystal composition, the coexisting photoreactive chiral agent is exposed to light to change the helical structure of the liquid crystal compound, by which change a different selective reflection color is displayed to form a pattern as visual imagery. Therefore, when the intensity of irradiation is changed in the individual desired regions, multiple colors are displayed corresponding to the intensity of irradiation. For example, if exposure to light is carried out through an exposure mask prepared by changing the photo-transmittance as visual imagery, an image, i.e., a colored region of a different selective reflection, will be formed concurrently. This is further cured (fixed) by irradiation of the second light to give a liquid crystal color filter.

The wavelength of the first light is preferably determined in the photo-sensitive wavelength region of the photoreactive chiral agent, particularly at the wavelength near the photo-sensitive peak wavelength, in order to obtain sufficient patterning sensitivity. In addition, the wavelength of the second light is preferably determined in the photo-sensitive wavelength region of the photo-polymerization initiator, particularly at the wavelength near the photo-sensitive peak wavelength, in order to obtain sufficient photo-polymerization sensitivity.

There is no particular limitation in the illuminance (irradiation intensity) of the first and second lights. The illuminance may properly be chosen so as to give sufficient photo-sensitivity during patterning and polymerization curing according to the materials to be used. As for the light source used in the first and second irradiations, the same ones as those usable in irradiation of the above-mentioned liquid crystal compositions can be employed.

More specifically, the color filter may be produced according to the following first and second embodiments of the production processes, according to which the filter can be produced more suitably.

The First Embodiment of the Production Process (1) Step of placing a liquid crystal composition in a coating liquid state on a tentative support to form a transcriptional material having at least liquid crystal layer.

The liquid crystal composition in a coating liquid state may be prepared by dissolving and dispersing the individual components in a proper solvent. The solvent includes, for example, 2-butanone, cyclohexanone, methylene chloride, chloroform, and the like. In producing a liquid crystal color filter, it is appropriate to use a cholesteric liquid crystal composition.

Between the liquid crystal layer and the temporary support, it is possible to place a cushion layer comprising a thermoplastic resin, etc., to assure adhesiveness at the transcription, for example, where there is a foreign matter on the support to be transcribed. It is also appropriate to make orientation processing such as rubbing processing (step of orientation processing) on the cushion surface.

(2) Step of laminating the transcriptional material on a photo-transmitting substrate.

In addition to the photo-transmitting substrate, an image-receiving material having an image-receiving layer on a substrate may be employed. Without using the transcriptional material, a liquid crystal composition may be coated directly on a substrate (coating step). The coating may be conducted according to a known coating method using a bar-coater or a spin-coater properly selected. In view of loss of the materials and cost, it is appropriate to employ a method for transcription.

(3) Step of peeling off the transcriptional material from the photo-transmitting substrate and forming a cholesteric liquid crystal layer on the substrate (transcriptional step).

The liquid crystal layer may be laminated after the subsequent step (4) to form multi-layers.

(4) Step of irradiating an ultraviolet ray of illuminance $\gamma^1$ to the cholesteric liquid crystal layer as visual imagery through an exposure mask to form a pixel pattern displaying a selective reflection color and further irradiating an ultraviolet ray of illuminance $\gamma^2$ thereto to make the layer cure (exposure step).

The Second Embodiment of the Production Process (1) Step of placing a liquid crystal composition directly on a support constituting a color filter to form a liquid crystal layer.

The liquid crystal layer may be formed by coating a liquid crystal composition prepared as a coating solution in the same manner as described above, with a bar-coater or spin-coater.

Between the cholesteric liquid crystal layer and the temporary support, it is possible to form an orientation film as mentioned above. On the surface of the orientation film, it is preferable to make orientation processing (orientation processing step) such as rubbing processing.

(2) The same exposure step as in the step (4) of the first embodiment in the production process.

The preferable thickness of the liquid crystal layer (a sheet liquid crystal composition) acting as a liquid crystal color filter is in 1.5–4 μm.

One example will be explained as follows according to FIGS. 1 to 3. FIGS. 1 to 3 are diagrammatic sketches showing one embodiment of producing the liquid crystal color filters of the invention.

First, the above-mentioned respective components are dissolved in a proper solvent to prepare a cholesteric liquid crystal composition as a coating liquid. In this connection, the respective components and solvents are as described above.

Figure 1B:
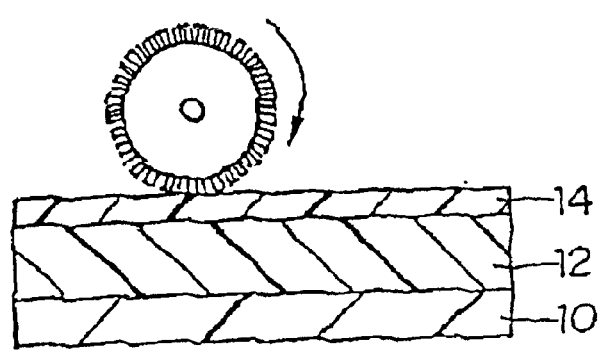

As shown in FIG. 1A, for example, acryl resin, polyester or polyurethane is applied on the support 10 (hereinafter also referred to as "temporary support") to form the cushion layer 12 (a thermoplastic resin layer), on which further the orientation film 14 comprising polyvinyl alcohol, etc., is laminated. The orientation film is processed by rubbing as shown in FIG. 1B. This rubbing processing, though it is not necessarily conducted, is effective in improving the orientation.

Figure 1C:
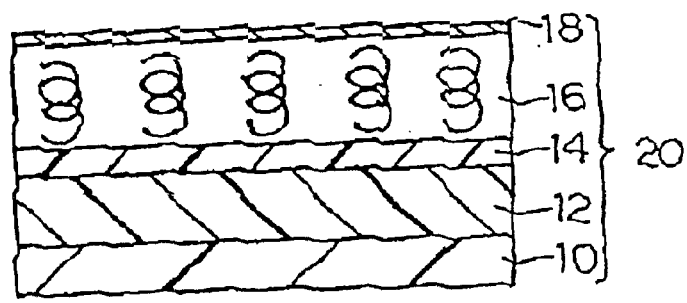

Next, as shown in FIG. 1C, a cholesteric liquid crystal composition as a coating liquid is applied on the orientation film 14 and dried to form the cholesteric liquid crystal layer 16, on which is then placed the cover film 18 to give a transcriptional material. Hereinafter, the transcriptional material is referred to as a transcriptional sheet 20.

Figure 1D:
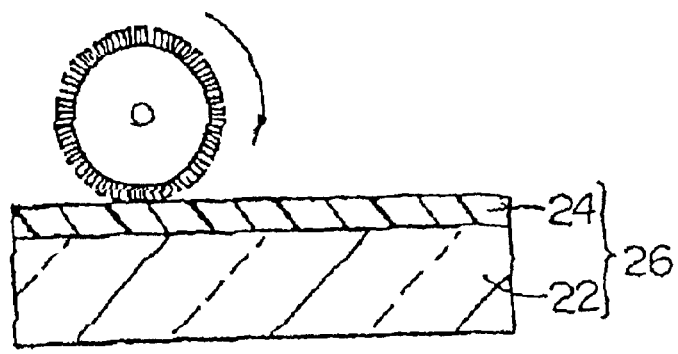

On the other hand, as shown in FIG. 1D, an orientation film 24 is formed on another support 22 in the same manner as described above, which is then processed by rubbing. Hereinafter, this is referred to as a color filter substrate 26.

Figure 2E:
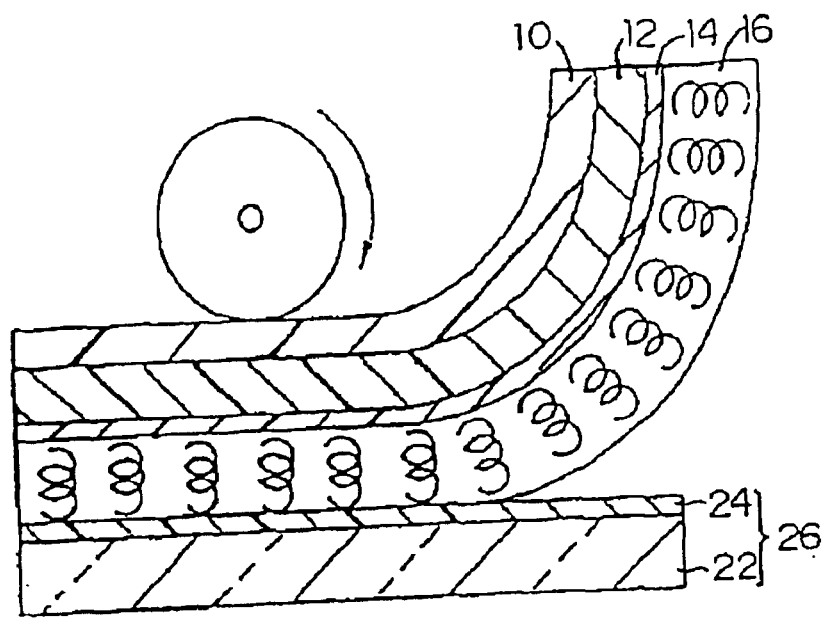
FIGS. 2E and 2F are diagrammatic sketches showing a part of the process for producing a liquid crystal color filter of the invention.
Figure 2F:
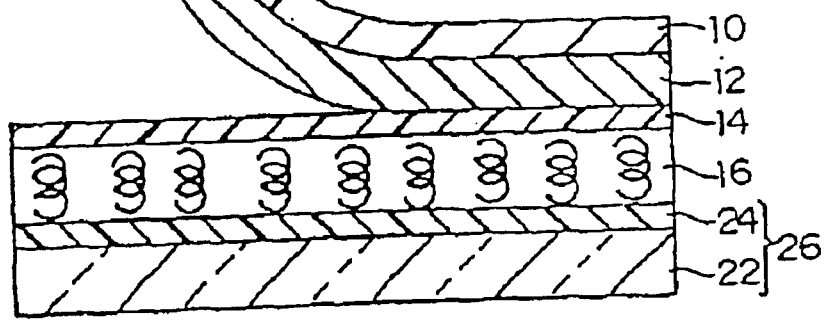

Next, the cover film 18 on the transcriptional sheet 20 is peeled off, and then, as shown in FIG. 2E, the transcriptional sheet 20 is laminated on the color filter substrate 26 so that the surface of the cholesteric liquid crystal layer 16 comes into contact with the surface of the orientation film 24. Thus, they are laminated with a roller rotating in the direction of the arrow as shown in the figure. Thereafter, as shown in FIG. 1F, the transcriptional sheet 20 is separated by peeling off between the orientation film 14 and the cushion layer 12, during which operation the cholesteric liquid crystal layer is transcribed together with the orientation film 14. In this case, the cushion layer 12 may not necessarily be peeled together with the temporary support 10.

Figure 3G:
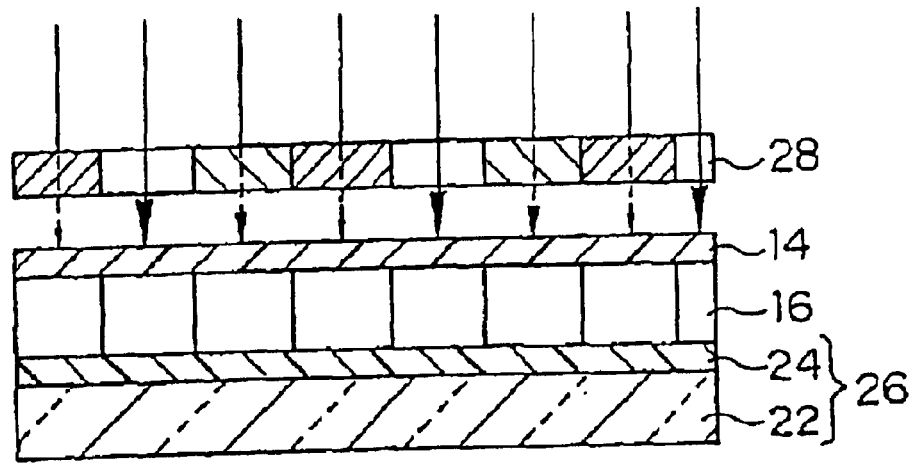
FIGS. 3G through 3I are diagrammatic sketches showing a part of the process for producing a liquid crystal color filter of the invention.

After transcription, as shown in FIG. 3G, an exposure mask 28 is placed on the upper portion of the orientation film 14, the mask 28 having multiple regions of different photo transmittance, through which the first light is irradiated to the cholesteric liquid crystal layer 16 as patterning. The cholesteric liquid crystal layer 16 contains a liquid crystal compound and a chiral compound so that the helical pitch is variable corresponding to the quantity of light. Thus, the structures different corresponding to the helical pitch form the regions for the respective patterns, for example, a region which reflects green (G) but transmits blue (B) and red (R), a region which reflects blue (B) but transmits green (G) and red (R), and a region which reflects red (R) but transmits green (G) and blue (B).

Figure 3H:
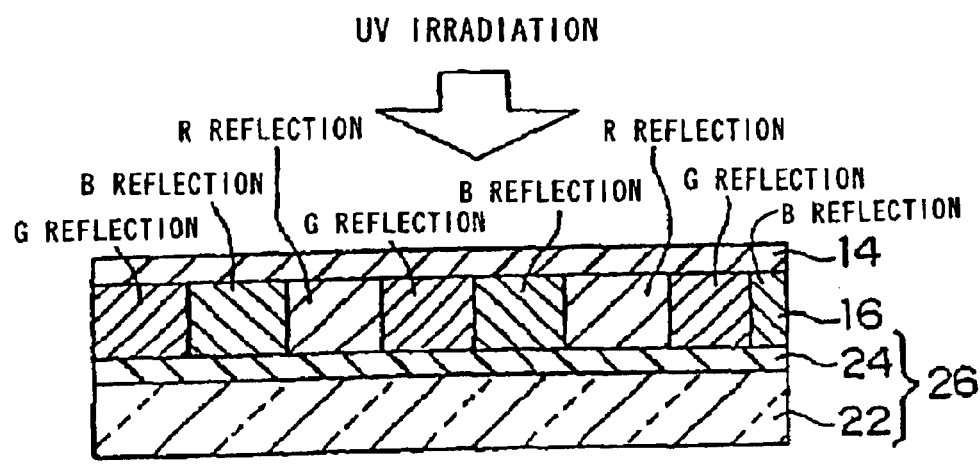

Next, as shown in FIG. 3H, the cholesteric liquid crystal layer 16 is irradiated with ultraviolet ray in the intensity different from that in the step G to fix the pattern. Then, unnecessary portions (for example, cushion layer, residual portion of the middle layers, unexposed portions) on the cholesteric liquid crystal layer 16 are eliminated with 2-butanone or chloroform to give a cholesteric liquid crystal layer having the region of BGR reflection as shown in FIG. 3I.

Figure 3I:
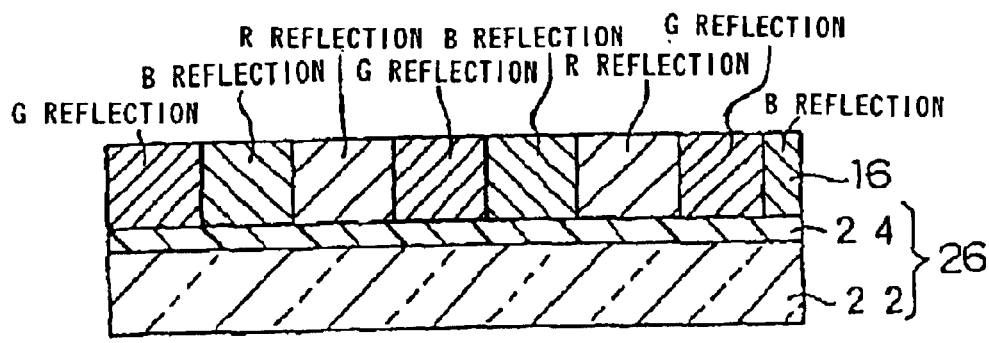

FIGS. 1 to 3 indicate one embodiment of a process for producing color filters in a laminate system. Alternatively, the color filters may be produced according to another process for coating in which a liquid crystal layer is coated directly on a substrate for color filter. In such a case, as adapted to the above-mentioned embodiment, a cholesteric liquid crystal layer is applied on the orientation film 24 of the substrate 26 for color filter as shown in FIG. 1D, then dried, and sequentially subjected to the respective steps as shown in FIGS. 3G to 3I.

The respective steps and the materials to be used such as transcriptional materials and supports have been described in details in Japanese Patent Application Nos. 11-342896 and 11-343665 filed by the present inventors.

As described above, when a liquid crystal composition containing an optically active polyesteramide having at least the structural units represented by the general formulae (I) and (II) or by the general formulae (III) and (IV) is used, the change ratio of the helical twisting power in liquid crystal to the quantity of light is increased to expand the width of selective reflection color displayed by the liquid crystal, giving a liquid crystal color filter comprising the primaries blue (B), green (G) and red (R) excellent in color purity and in resolution.

Optical Films

The optical film of the invention comprises a liquid crystal compound and at least one optically active polyesteramide, and an optional optical wavelength can be fixed from a wide range of wavelength. The film, if required, may comprise other components exemplified by the liquid crystal compositions of the invention, such as a polymerizing monomer, a photo-polymerization initiator, and a surface active agent having an excluded volume effect. Thus, the film can be produced by irradiation with light in a properly selected desired pattern and the quantity of light. For example, the film can be produced according to "Method for changing the helical structure of liquid crystal" and "Method for fixation of the helical structure of liquid crystal".

The optical film of the invention may be produced with a composition properly selected from the liquid crystal compositions of the invention and known compositions, and in addition, compositions containing at least an optically active polyesteramide having the structural units represented by the general formulae (I) and (II) or by the general formulae (III) and (IV). In this situation, there is no limitation in the form of the film. The film may be in a sheet shape composed of the liquid crystal composition alone, or in a form in which a layer containing the liquid crystal composition (liquid crystal layer) is placed on a desired support or temporary support. Further, an additional layer (film) such as orientation film or protective film may be placed thereon.

As the liquid crystalline compound, polymerizing monomer, photo-polymerization initiator, and other components, the same components as those usable in the liquid crystal compositions of the invention may be used, and the content of them and the preferable range are also the same as in the liquid crystal compositions. Additionally, in the liquid crystal composition constituting the optical films, the content of the optically active polyesteramide having at least the structural units represented by the general formulae (I) and (II) or by the general formulae (III) and (IV) is also the same as in the liquid crystal compositions.

The optical films of the invention can be produced, for example, by using the liquid crystal compositions of the invention.

The optical films can be produced in approximately the same manner as in the process for producing the liquid crystal color filters, wherein at least an additional step for exposure as described above may be included. In other words, "Method for fixation of the helical structure of liquid crystal" may be applied. In addition, the films may be produced, according to the selected embodiment for production, through such a step as the orientation processing step, transcriptional step and coating step.

More specifically, the optical films can be produced in the approximately the same manner as in the above-mentioned first and second embodiments of the production process.

As described above, when a liquid crystal composition containing an optically active polyesteramide having at least the structural units represented by the general formulae (I) and (II) or by the general formulae (III) and (IV) is used, an optical film of non-photo absorption type which is able to change significantly the helical pitch of liquid crystal for the quantity of light can be obtained. For example, when the liquid crystal phase is of a cholesteric liquid crystal, an optical film which has a wide range of selective reflection color and comprises colorful selective reflection colors or a film which displays the primaries (B, G, R) excellent in color purity and in resolution.

Recording Media

The recording media of the invention comprises a liquid crystal compound and at least one optically active polyesteramide, and if required, further comprise other components exemplified by the liquid crystal compositions of the invention, such as polymerizing monomer, photo-polymerization initiator, and surface active agent having an excluded volume effect.

There is no limitation in the form of the recording media of the invention. The recording media may be in a sheet shape composed of the liquid crystal composition alone, or in a form in which a layer containing the liquid crystal composition (liquid crystal layer) containing the photoreactive chiral agent is placed on a desired support or temporary support (hereinafter referred to as "support, etc." The liquid crystal composition may properly be selected from the liquid crystal compositions of the invention and known compositions, particularly from the compositions containing at least an optically active polyesteramide having the structural units represented by the general formulae (I) and (II) or by the general formulae (III) and (IV). Further, an additional layer (film) such as orientation film or protective film may be placed thereon.

As the liquid crystalline compound, polymerizing monomer, photo-polymerization initiator, and other components, the same components as those usable in the liquid crystal compositions of the invention may be used, and the content of them and the preferable range are also the same as in the liquid crystal compositions. Additionally, in the liquid crystal composition constituting the recording media, the content of the optically active polyesteramide having at least the structural units represented by the general formulae (I) and (II) or by the general formulae (III) and (IV) is also the same as in the liquid crystal compositions.

The recording media of the invention can be produced preferably by placing the liquid crystal composition of the invention on a support.

In placing a liquid crystal composition on a support, the following processes can be employed; (1) a process for transcribing the liquid crystal layer on a support using a transcription material on which a liquid crystal layer containing the liquid crystal composition of the invention is placed; and (2) a process for coating a liquid crystal composition prepared as a coating solution directly on a support.

In the processes (1) and (2), the transcription material and the process for coating may be based on the embodiments exemplified in the liquid crystal compositions of the invention (the first and second embodiments) and the illustration in FIGS. 1 to 3.

The recording media of the invention produced as described above, when irradiated with light in a desired pattern and quantity properly selected, are able to form a visual imagery responding on the change ratio of twisting power of the liquid crystal, particularly, a colored image constituted by a selective reflection color determined by the change ratio of helical pitch in cholesteric liquid crystals. The formation of visual imagery may be attained, for example, according to "Method for changing the helical structure of liquid crystal" and "Method for fixation of the helical structure of liquid crystal".

In addition, when an optically active polyesteramide having the structural units at least represented by the general formulae (I) and (II) or by the general formulae (III) and (IV) is used as an chiral agent changing the liquid crystal structure, the change ratio of helical twisting power of liquid crystal to the quantity of light is increased and as a result a visual imagery having a wide range of color reproduction is formed. Particularly, in the cholesteric liquid crystals, the width of hue selectively reflected by the liquid crystals expands to form a colorful and multi-colored image in high color purity and in high resolution. The high rate of the twisting power change contributes to high sensitivity (high speed) during image formation.

Additionally, the liquid crystal after patterning can be fixed, for example, by using a polymerizing liquid crystal compound or polymerizing monomer to form a highly stable visual imagery.

As for the light source used in the irradiations, the same ones as those usable in irradiation of the above-mentioned liquid crystal compositions of the invention can be used to properly attain optical recording. The fixation of the liquid crystals can also be attained in the same way of irradiation.

As demonstrated above, the twisting power (twisted angle) can be changed greatly by particularly using an optically active polyesteramide having the structural units at least represented by the general formulae (I) and (II) or by the general formulae (III) and (IV) as a chiral agent for changing the helical structure of the liquid crystal molecule. Particularly, in a case of cholesteric liquid crystals using a nematic liquid crystal compound, the wavelength range of selective reflection by irradiation is expanded to enhance the color purity and resolution of the BGR primaries. Accordingly, the selectivity of liquid crystal hue and visibility are improved; particularly in liquid crystal color filters and optical films, clear and fine color pictures are displayed; in recording media, the hue of the formed image can be made colorful.

EXAMPLES

The invention will be explained according to the following examples of syntheses and utility of optically active polyesteramides, which are not intended as a limitation thereof. In these examples, "part(s)" and "%" respectively indicate "part(s) by weight" and "% by weight".

Example 1

Synthesis of a Polyesteramide of (1-1)/(A-1)=2/3 (Molar Ratio of the Amount Used)

To a mixture of 1 mmole (0.44 g) of the following compound (C-1) and 5 ml of dimethylacetamide was added 1.5 mmol (0.30 g) of terephthalic acid chloride under ice cooling. After stirring at room temperature for 2 hours, there were added 5 ml of ethanol and 4 mmole (0.56 ml) of triethylamine, and the mixture was stirred for 30 minutes. The reaction mixture was poured into water and the resulting solid material was collected by filtration and washed with water and methanol to give 0.6 g of the polyesteramide of (1-1)/(A-1)=2/3 (molar ratio of the amount used) as white powder in 92% yield.

Melting point of the resulting polymer was higher than 250° C.

Compound (C-1)

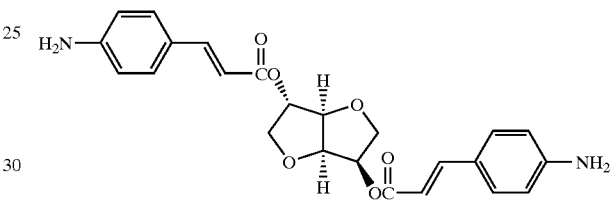

Example 2

Synthesis of a Polyesteramide of (3-2)/(A-1)=2/3 (Molar Ratio of the Amount Used)

To a mixture of 0.68 mmole (0.50 g) of the following compound (C-2), 1.02 mmole (0.21 g) of terephthalic acid chloride and 5 ml of tetrahydrofuran was dropwise added a solution of 2.04 mmole (0.21 g) of triethylamine in 5 ml of tetrahydrofuran under ice cooling. After stirring at room temperature for 1 hour, there was added ethanol, and the mixture stirred for additional 30 minutes. The reaction mixture was poured into water and the resulting solid material was collected by filtration and washed with water and methanol to give 0.41 g of the polyesteramide of (3-2)/(A-1)=2/3 (molar ratio of the amount used) as light yellow solid material in 65% yield.

Melting point of the resulting polymer was higher than 250° C.

Compound (C-2)

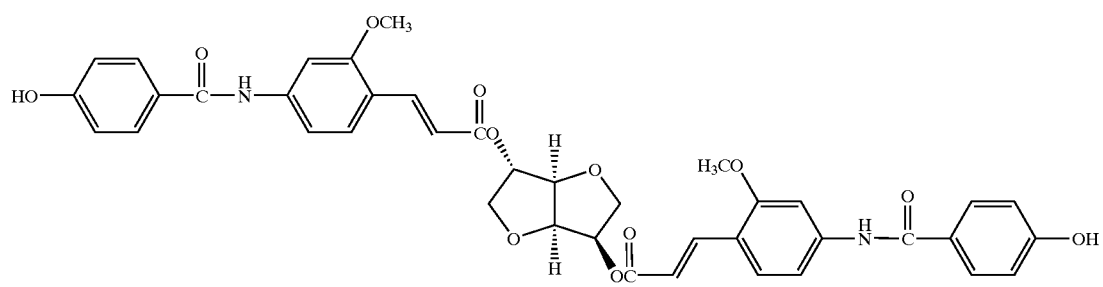

Example 3

Synthesis of a Polyesteramide of (3-2)/(B-1)=2/3 (Molar Ratio of the Amount Used)

In the same manner as in Example 2, except that terephthalic acid chloride was replaced with sebacic acid chloride, the polyesteramide of (3-2)/(B-1)=2/3 (Molar Ratio of the Amount Used) was obtained as light yellow solid material in 86% yield.

Melting point of the resulting polymer was 130–150° C.

Example 4

Synthesis of a Polyesteramide of (3-3)/(A-1)=2/3 (Molar Ratio of the Amount Used)

In the same manner as in Example 2, except that the compound (C-2) was replaced with the following compound (C-3), the polyesteramide of (3-3)/(A-1)=2/3 (molar ratio of the amount used) was obtained as light yellow solid material in 78% yield.

Melting point of the resulting polymer was 230–250° C.

Compound (C-3)

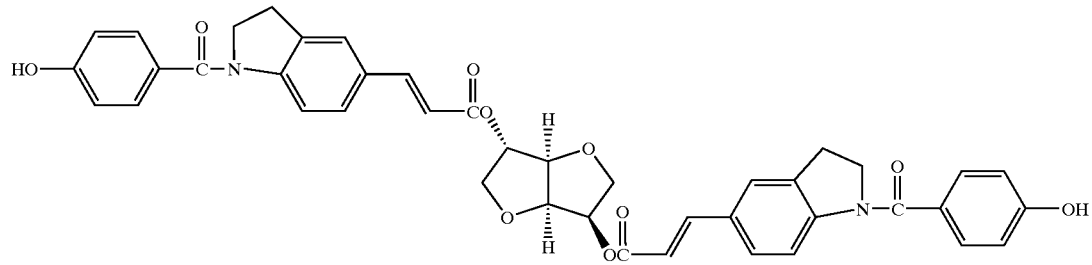

Example 5

Synthesis of a Polyesteramide of (3-3)/(B-1)=2/3 (Molar Ratio of the Amount Used)

In the same manner as in Example 4, except that terephthalic acid chloride was replaced with sebacic acid chloride, the polyesteramide of (3-3)/(B-1)=2/3 (molar ratio of the amount used) was obtained as light yellow solid material in 74% yield.

Melting point of the resulting polymer was 110–120° C.

Example 6

(Measurement of the Change of Helical Pitch Depending on Irradiation)

The polyesteramide synthesized in Example 5 was added as a photoreactive chiral agent at a rate of 0.5% to a nematic liquid crystal composition (ZLI-1132, a product of Merck & Co.), and the mixture was poured into a wedge-shaped cell (1.1 mm in thickness of glass, blue plate) for which uniaxial orientation processing was made with a polyimide orientation film. Here, the helical pitch was measured at room temperature by means of a polarizing microscope, and this was converted into helical twisting power (HTP). The result was 9.3 $\mu m^{-1}$ as HTP.

Subsequently, the above wedge-shaped cell was irradiated by ultraviolet ray with a high pressure mercury lamp at the intensity of 300 mW/cm$^2$ for 3 minutes. After irradiation, the helical pitch was measured at room temperature in the same manner as mentioned above, and this was converted into HTP. The result was 3.7 $\mu m^{-1}$ as HTP after irradiation. From the difference from the initial value, it was found that the rate of the change of HTP was 2.5, indicating the helical twisting power (HTP) being considerably changed by irradiation of ultraviolet ray. This was confirmed by a contacting method that the direction of twisting before and after the irradiation of ultraviolet ray was dextrorotatory in both cases.

A sample of which the helical pitch was changed as described above was kept on a hot plate at 140° C. for 5 minutes, and the helical pitch was measured in the same manner. The HTP after heating was 3.7 $\mu m^{-1}$. It was found that the optically active isosorbide derivative was highly stable to heat.

Example 7

(Production of a Broadband Circular Polarizing Reflection Plate)

(1) Preliminarily Arrangements of a Substrate

On a glass substrate was applied a coating solution for polyimide orientation film (manufactured by Hitachi Chemical Du Pont Co., trade name: LX-1400) with a spin coater, and the substrate was dried in an oven at 100° C. for 5 minutes and then burned in an oven at 250° C. for 1 hour to give an orientation film. Further, the surface of the film was processed by rubbing for orientation to give a glass substrate with an orientation film.

(2) Production

On the orientation film of the glass substrate prepared above was applied with a bar-coater a coating solution prepared in the following formulation, and the substrate was kept on a hot plate at 110° C. for 5 minutes and then irradiated with an ultrahigh pressure mercury lamp at the same temperature for 1 minute through a band-pass filter having a light source central wavelength of 365 nm.

Subsequently, the substrate was kept at 110° C. in a dark place for 5 minutes, and after removal of the band-pass filter the whole surface was exposed to light with an ultrahigh pressure mercury lamp at irradiation energy of 500 mJ/cm$^2$ under blow of nitrogen gas to cause polymerization and fixation. Thus, the circular polarizing reflection plate was prepared. Formulation of the coating solution is:

42 parts by weight of

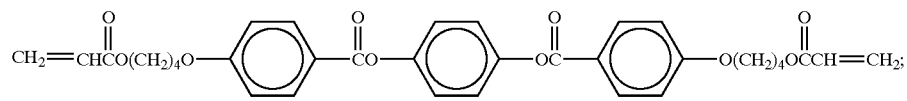

42 parts by weight of

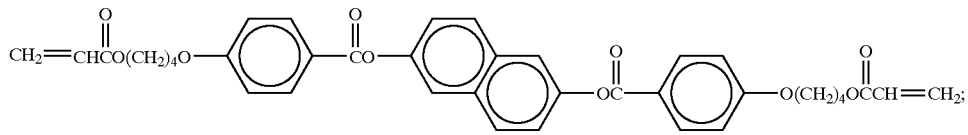

8 parts by weight of

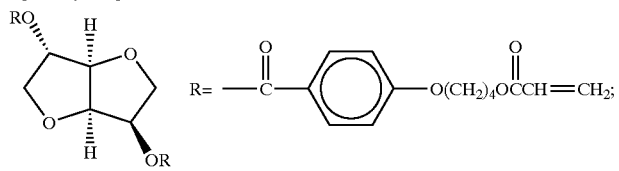

6 parts by weight of polyesteramide of Example 3;

2 parts by weight of

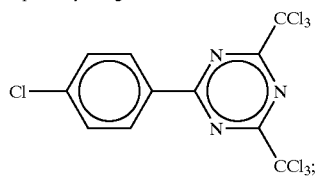

5 parts by weight of

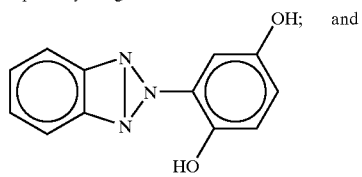   and 400 parts by weight of chloroform.

Thus prepared circular polarizing reflection plate displays the selective reflection in a wide range of wavelength at 500–650 nm, indicating that it could be used as a broadband circular polarizing reflection plate having a sufficient band character. In addition, the rate of dextrorotatory circular polarizing reflection reached 90% at the selective reflection wavelength of 550 nm.

Example 8
(Production of Liquid Crystal Color Filters)
(1) Preliminarily Arrangements of a Filter Substrate A coating solution of polyimide orientation film (manufactured by Hitachi Chemical Du Pont Co., trade name: LX-1400) was applied on a glass substrate with a spin coater, dried in an oven at 100° C. for 5 minutes and then burned in an oven at 250° C. for 1 hour to form an orientation film. Further, the surface of the film was processed by rubbing for orientation to give a glass substrate with an orientation film.

(2) Formation of the Filter Layer

On the orientation film of the glass substrate prepared above was applied with a spin-coater a coating solution prepared in the following formulation, and the substrate was dried in an oven at 110° C. for 2 minutes to form a photosensitive resin layer.

Formulation of the coating solution is:

42 parts by weight of

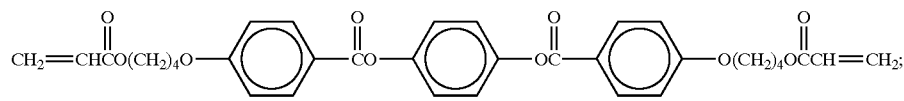

42 parts by weight of

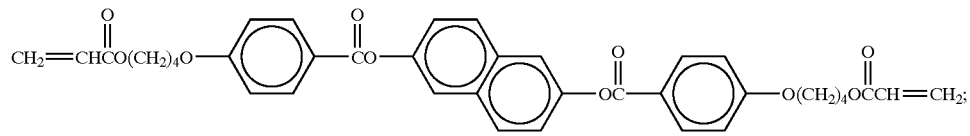

6 parts by weight of

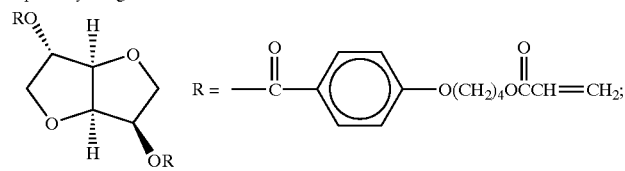

5 parts by weight of polyesteramide of Example 4;

2 parts by weight of

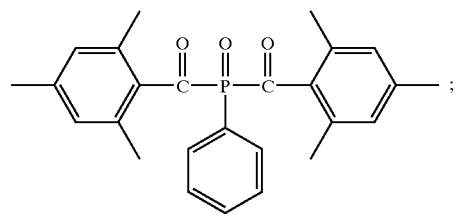

3 parts by weight of dipentaerythritol hexaacrylate; and
400 parts by weight of chloroform.

The glass substrate was then place on a hot plate at 110° C. for 5 minutes so as to come into contact with the surface in order to make the photosensitive resin layer colored. An ultrahigh pressure mercury lamp was placed above the photosensitive resin layer, and irradiation was made through a photo-mask and a band-pass filter for patterning; wherein the photo-mask had 3 stages of different transmittance (0%, 46% and 92%) of which the respective regions were arranged corresponding to blue pixels, green pixels and red pixels; and the band-pass filter had a central wavelength at 365 nm. In this operation, the irradiation energy was 120 mJ/cm² for the red pixels, and the intensity was 30 mW/cm².

Next, the photo-mask and band-pass filter were removed, in place of which a sharp-cut filter transmitting the light of 400 nm or higher (50% transmission at 400 nm) was disposed, and the whole surface was irradiated with the same ultrahigh mercury lamp at the irradiation energy of 500 mJ/cm² under blowing of nitrogen gas for polymerization and fixation. In order to further promote the curing degree of the filter portion (photosensitive resin layer), the filter was burn in an oven at 220° C. for 20 minutes; thus, a color filter comprising the patterns of red pixels, green pixels and blue pixels was obtained.

In the above patterning, the helical pitch of liquid crystals (twisting power of liquid crystals) could considerably be changed by irradiation to form the pixel pattern comprising red, green and blue in high color purity.

Example 9

(Production of an Optical Compensation Film for STN Elements)

On triacetylcellulose (TAC) of 80 µm in thickness was formed a polyvinyl alcohol (PVA) film of 99.5% saponification by a bar-coat method and the film was heated at 110° C. for 3 minutes. Rubbing processing was made on the PVA film, on which a coating solution prepared in the following formulation was coated with a bar-coater under warming and dried in an oven at 120° C. for 3 minutes to form a film.

Formulation of the coating solution is:

42 parts by weight of

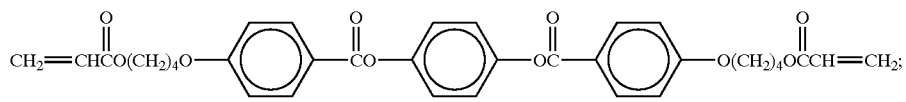

42 parts by weight of

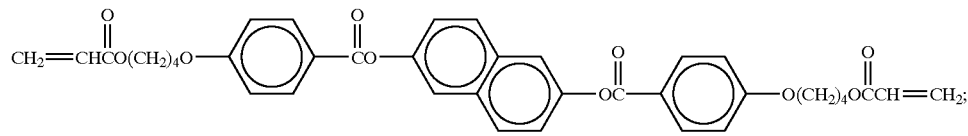

0.3 parts by weight of polyesteramide of Example 5;

2 parts by weight of

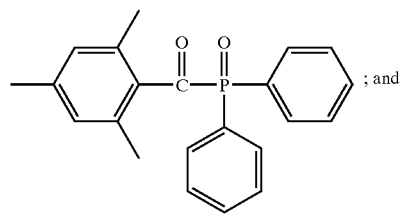; and 400 parts by weight of chloroform.

Subsequently, the film was irradiated from top by ultraviolet ray with a high pressure mercury lamp (irradiation energy 1000 mJ/cm$^2$) at 100° C. for polymerization and fixation to give an optical compensation film for STN elements (hereinafter referred to as "STN compensation film"). The thickness of the STN compensation film measured at this point was 5.0 µm. In addition, from the profile of the polarizing transmission spectrum, it was found that the orientation of liquid crystal molecule (helical structure) was twisted by 240° in direction of the film thickness and the helical twisting angle (angle of rotation) was 240°.

On the other hand, another STN compensation film having a twisting angle in the reverse direction (−240°) to the original film was prepared and overlapped so that the coincident portions of liquid crystal molecules were crossed orthogonally. This was inserted between two polarizing plates, of which the absorption axes were crossed orthogonally, and observed visually to confirm displaying satisfactory black. Therefore, it was confirmed that the film (STN compensation film) prepared as above worked as an optical compensation film for STN elements.

Example 10
(Prevention of Occurrence of the Reverse Twist Domains in the TN Elements)

On the ITO film provided on a glass substrate was applied a coating solution of a polyimide orientation film (manufactured by Hitachi Chemical Du Pont Co., trade name: LX-1400) with a spin coater, and the substrate-was dried in an oven at 100° C. for 5 minutes and then burned in an oven at 250° C. for 1 hour to give an orientation film. Further, the surface of the film was processed by rubbing for orientation to give a glass substrate of which the film had the rubbing angle of 90°. Thus, two glass plates with orientation films were prepared.

The glass plates were disposed so that the orientation films were oppositely faced each other and stuck each other with a two-fluid epoxide resin adhesive containing spacer beads of 6 µm in diameter to give a driving cell. The thickness of the cell was measured by a photo-interference method to indicate 5.4 µm.

In the above cell was poured a composition comprising the following components.
Composition:
Nematic liquid crystal composition (manufactured by Merck & Co., trade name: ZLI-1132) 99.9%
Photoreactive chiral agent of the invention (the polyesteramide of Example 2) 0.1%

Next, the driving cell containing the composition was inserted between the two polarizing plates of which the absorption axes were crossed orthogonally, and visually observed. As a result, there was observed no occurrence of reverse twist domain. Therefore, it is expected that an image excellent in contrast and color purity will be displayed without decrease of the contrast due to occurrence of reverse twist.

According to the invention, a novel optically active compound can be provided which has photosensitivity to the light near 365 nm and is capable of changing the structure by photo-isomerization, and of which the cis-isomer after photo-isomerization is highly stable to heat.

According to the invention, a photoreactive chiral agent can be provided which can control the orientation of liquid crystal compounds and has a high level of the change ratio (twist change ratio) for the helical pitch (twisting power) of liquid crystals by light; for example, in the case of using a nematic liquid crystal compound, the selective reflection involving the primaries (B, G, and R) is allowed to display the primaries in high color purity and high resolution.

According to the invention, a liquid crystal composition can be provided which comprises a photoreactive chiral agent allowing change of the helical pitch (twisting power) of liquid crystals and having a high twist change ratio to significantly control sterically the orientation of the liquid crystal molecule to convert the optical character. For example, in a cholesteric liquid crystal, a wide range of the selective reflection color involving the primaries (B, G, and R) is displayed, allowing to display the primaries by irradiation in high color purity and high resolution.

According to the invention, a method for changing the helical structure of liquid crystals is provided which comprises significantly changing the helical pitch (twisting power) of liquid crystals by irradiating light to a liquid crystal composition containing a photoreactive chiral agent with a high twist change ratio.

According to the invention, a method for fixing the helical structure of liquid crystals is provided by which a liquid crystal composition containing a photoreactive chiral agent with a high twist change ratio can be maintained and fixed after irradiation as visual imagery without damaging the patterned helical pitch; particularly, when the liquid crystal phase is of cholesteric liquid crystals, the helical structure of liquid crystals is fixed at the desired selective reflection color to give hue in high purity.

According to the invention, a color filter of liquid crystals in high color purity is provided which contains a photoreactive chiral agent causing a significant change in the helical pitch (twisting power) of liquid crystals by irradiation.

According to the invention, a light non-absorption type optical film containing a photoreactive chiral agent causing a significant change in the twisting power of liquid crystals by irradiation is provided; for example, in a cholesteric liquid crystal phase, it is possible to provide an optical film having a wide range of selective reflection and high color purity.

According to the invention, a recording medium is provided which contains a photoreactive chiral agent causing a significant change in the twisting power of liquid crystals by irradiation and can form a fine image by changing the quantity of light as visual imagery; for example, when the liquid crystal phase is of cholesteric liquid crystals, the medium can form a visual image which comprises selective reflection colors having a wide range of hue and high color purity.

What is claimed is:

1. An optically active polyesteramide comprising at least a structural unit represented by the following general formula (I) and a structural unit represented by the following general formula (II):

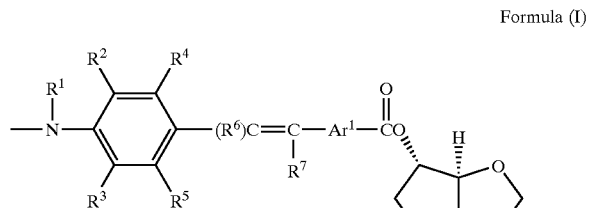

Formula (I)

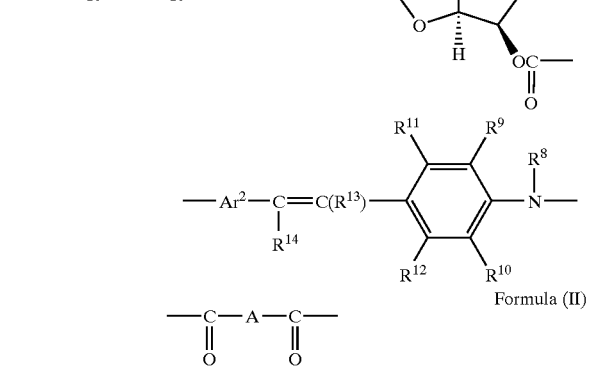

Formula (II)

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

2. An optically active polyesteramide comprising at least a structural unit represented by the following general formula (III) and a structural unit represented by the following general formula (IV):

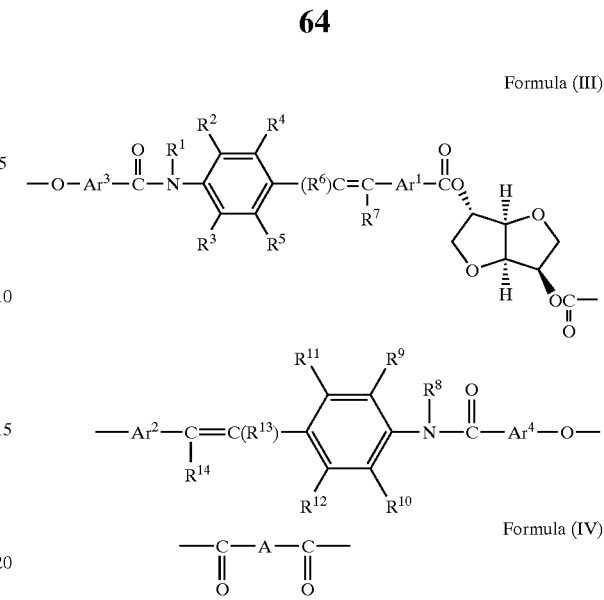

Formula (III)

Formula (IV)

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

3. A photoreactive chiral agent comprising an optically active polyesteramide, wherein the optically active polyesteramide includes at least a structural unit represented by the following general formula (I) and a structural unit represented by the following general formula (II):

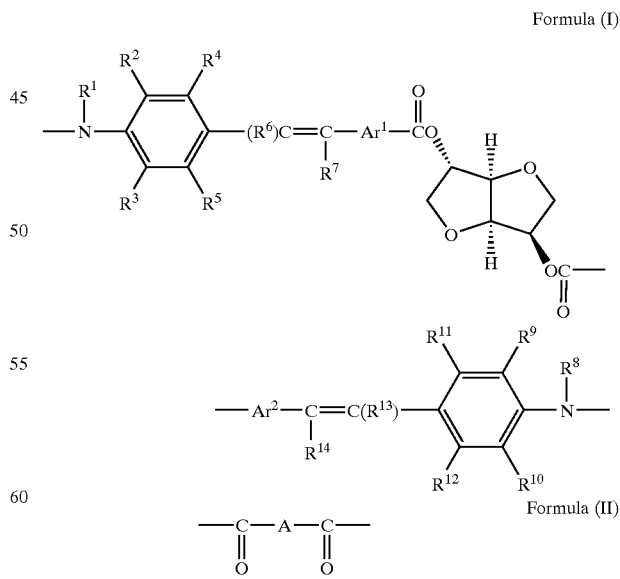

Formula (I)

Formula (II)

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

4. A photoreactive chiral agent comprising an optically active polyesteramide, wherein the optically active polyesteramide includes at least a structural unit represented by the following general formula (III) and a structural unit represented by the following general formula (IV):

Formula (III)

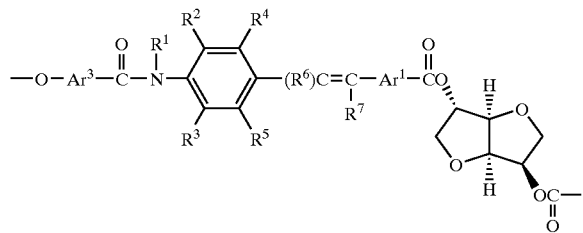

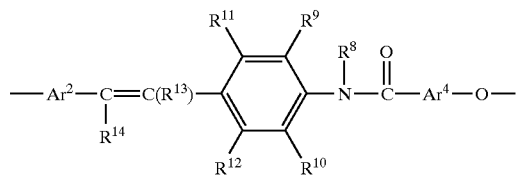

-continued

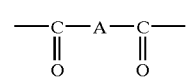

Formula (IV)

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

5. A liquid crystal composition comprising a liquid crystal compound and an optically active polyesteramide, wherein the optically active polyesteramide includes at least a structural unit represented by the following general formula (I) and a structural unit represented by the following general formula ((II):

Formula (I)

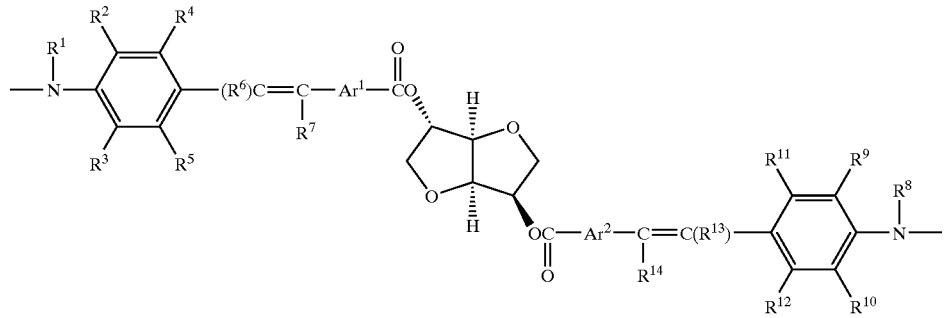

Formula (II)

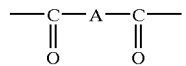

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

6. A liquid crystal composition comprising a liquid crystal compound and an optically active polyesteramide, wherein the optically active polyesteramide includes at least a structural unit represented by the following general formula (III) and a structural unit represented by the following general formula (IV):

7. A liquid crystal composition according to claim 5, further comprising a photopolymerization initiator, and wherein the liquid crystal compound has at least one polymerizing group.

8. A liquid crystal composition according to claim 6, further comprising a photopolymerization initiator, and wherein the liquid crystal compound has at least one polymerizing group.

9. A liquid crystal composition according to claim 7, wherein the optically active polyesteramide and photopolymerization initiator have respectively different photosensitive wavelength ranges.

10. A liquid crystal composition according to claim 8, wherein the optically active polyesteramide and photopolymerization initiator have respectively different photosensitive wavelength ranges.

Formula (III)

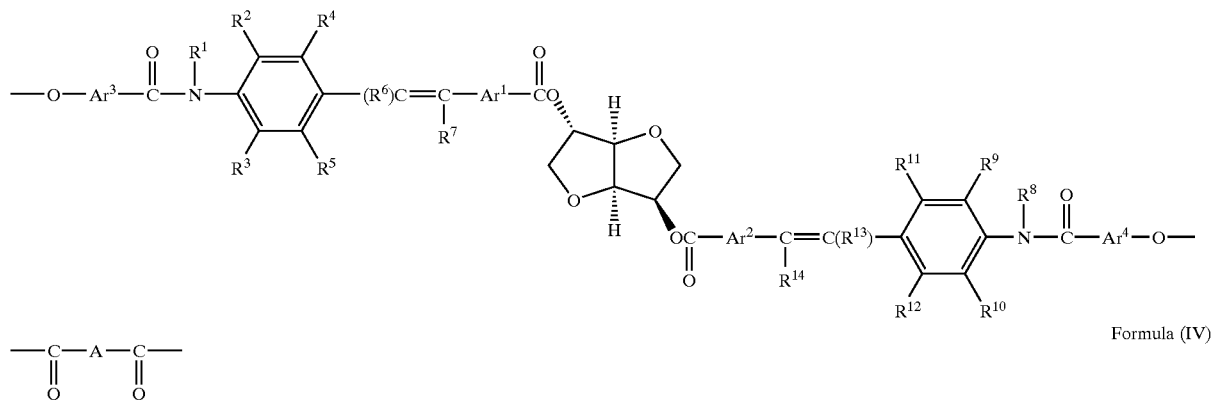

Formula (IV)

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

11. A method for changing a helical structure formed by a liquid crystal compound, the method comprising the steps of:

irradiating a liquid crystal composition comprising the liquid crystal compound and at least one type of optically active polyesteramide; and changing the structure of the optically active polyesteramide, wherein the optically active polyesteramide comprising at least a structural unit represented by the following general formula (I) and a structural unit represented by the following general formula (II):

Formula (I)

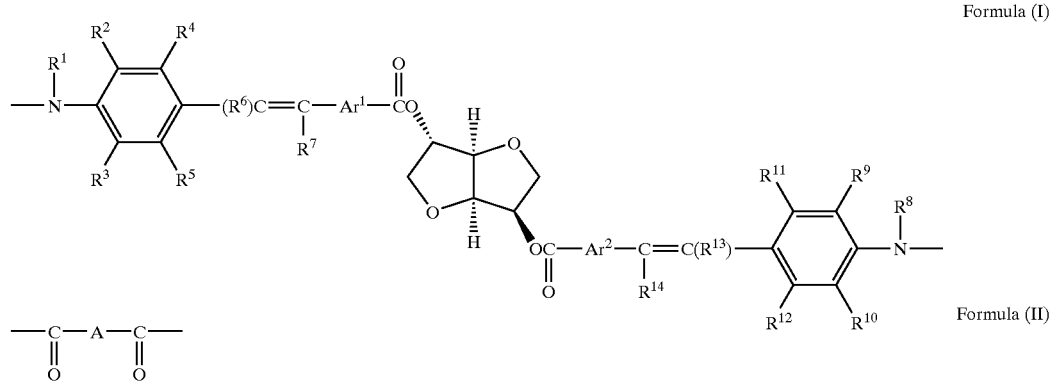

Formula (II)

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

12. A method for changing the helical structure formed by a liquid crystal compound, the method comprising the steps of:

irradiating a liquid crystal composition comprising the liquid crystal compound and at least one type of optically active polyesteramide; and changing the structure of the optically active polyesteramide, wherein the optically active polyesteramide comprises at least a structural unit represented by the following general formula (III) and a structural unit represented by the following general formula (IV):

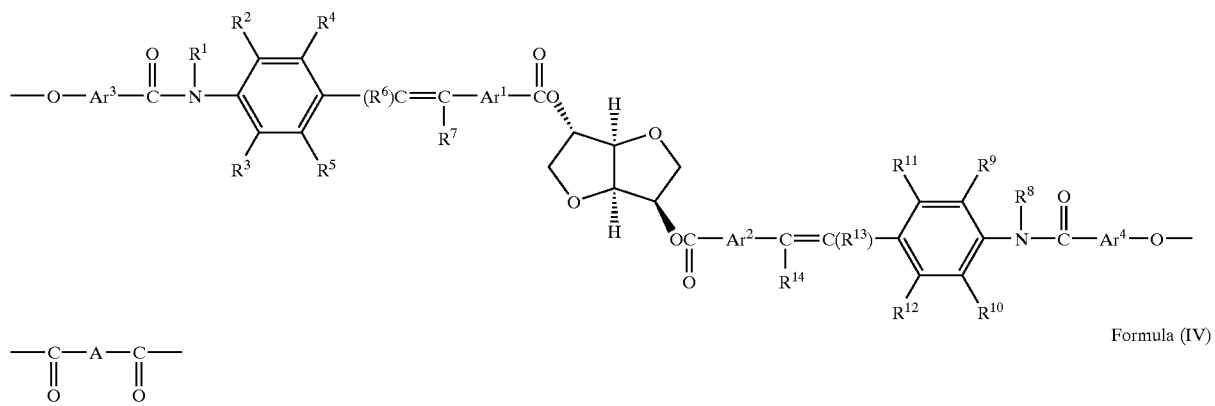

Formula (III)

Formula (IV)

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

13. A method for fixing the helical structure formed by a liquid crystal compound, the method comprising the steps of:

irradiating a liquid crystal composition comprising the liquid crystal compound, at least one type of optically active polyesteramide and a photopolymerization initiator with imagewise light in a range of photosensitive wavelength of the optically active polyesteramide; and polymerizing by irradiating the composition with light in a range of photosensitive wavelength of the photopolymerization initiator for photopolymerization, wherein the optically active polyesteramide comprises at least a structural unit represented by the following general formula (I) and a structural unit represented by the following general formula (II):

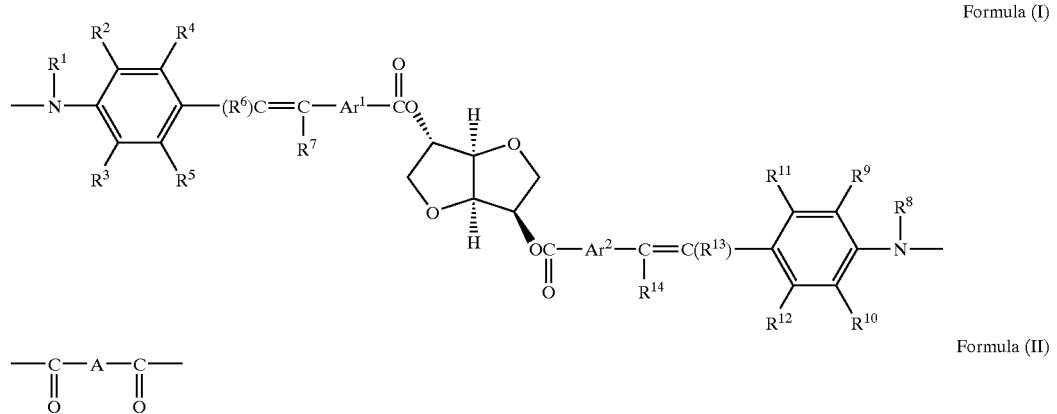

Formula (I)

Formula (II)

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

14. A method for fixing the helical structure formed by a liquid crystal compound, the method comprising the steps of:

irradiating a liquid crystal composition comprising the liquid crystal compound, at least one type of optically active polyesteramide and a photopolymerization initiator with imagewise light in a range of photosensitive wavelength of the optically active polyesteramide; and polymerizing by irradiating the composition with light in a range of photosensitive wavelength of the photopolymerization initiator for photopolymerization, wherein the optically active polyesteramide comprises at least a structural unit represented by the following general formula (III) and a structural unit represented by the following general formula (IV):

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

15. A liquid crystal color filter comprising a liquid crystal compound and at least one type of optically active polyesteramide, wherein the optically active polyesteramide includes at least a structural unit represented by the following general formula (I) and a structural unit represented by the following general formula (II):

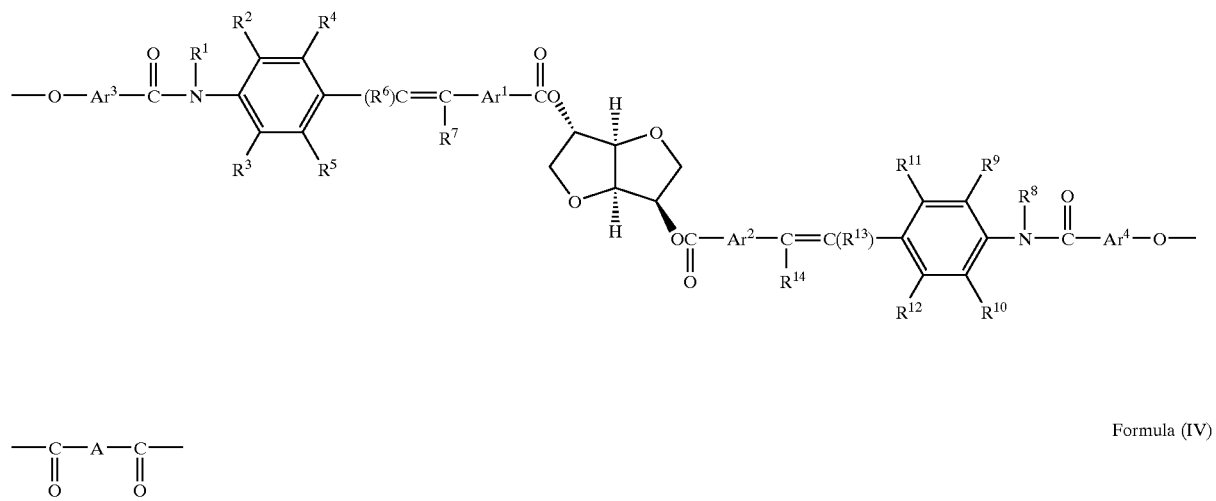

Formula (III)

Formula (IV)

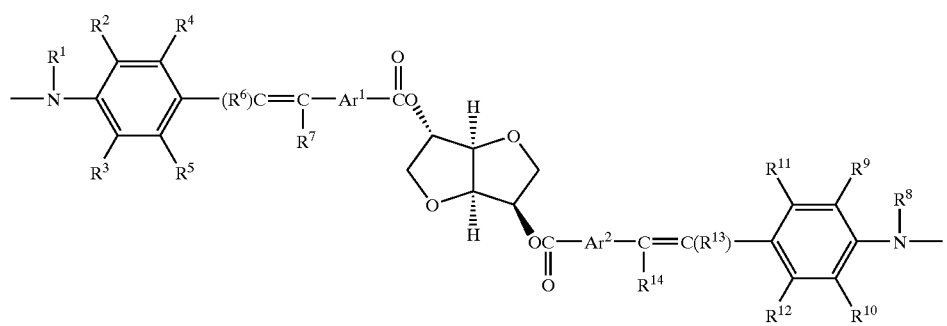

Formula (I)

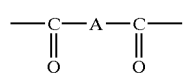

Formula (II)

wherein in a general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

16. A liquid crystal color filter which comprising a liquid crystal compound and at least one type of optically active polyesteramide, wherein the optically active polyesteramide includes at least a structural unit represented by the following general formula (III) and a structural unit represented by the following general formula (IV):

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

17. An optical film comprising a liquid crystal compound and at least one type of optically active polyesteramide, wherein the optically active polyesteramide includes at least a structural unit represented by the following general formula (I) and a structural unit represented by the following general formula (II):

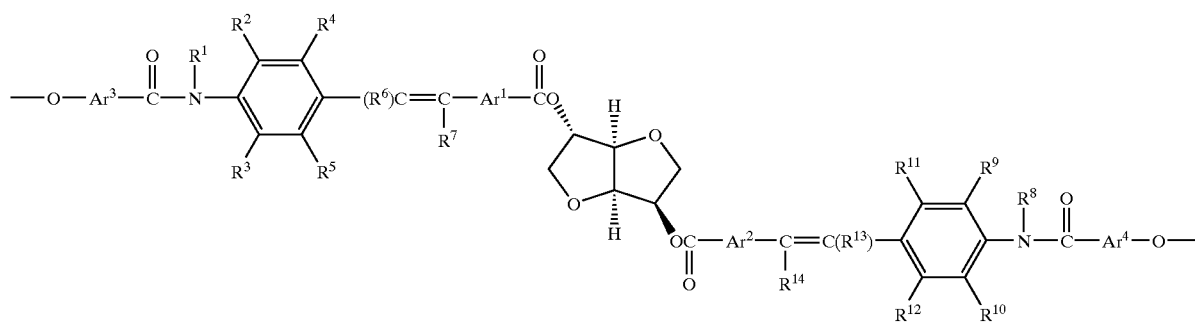

Formula (III)

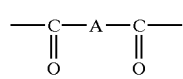

Formula (IV)

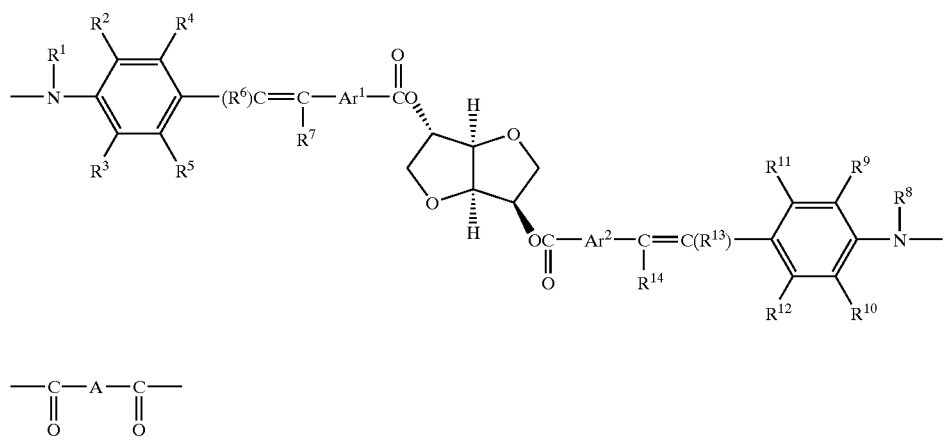

Formula (I)

Formula (II)

$$—\underset{\underset{O}{\|}}{C}—A—\underset{\underset{O}{\|}}{C}—$$

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

18. An optical film comprising a liquid crystal compound and at least one type of optically active polyesteramide, wherein the optically active polyesteramide includes at least a structural unit represented by the following general formula (III) and a structural unit represented by the following general formula (IV):

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

19. A recording medium comprising a crystal compound and at least one type of optically active polyesteramide, wherein the optically active polyesteramide includes at least a structural unit represented by the following general formula (I) and a structural unit represented by the following general formula (II):

Formula (III)

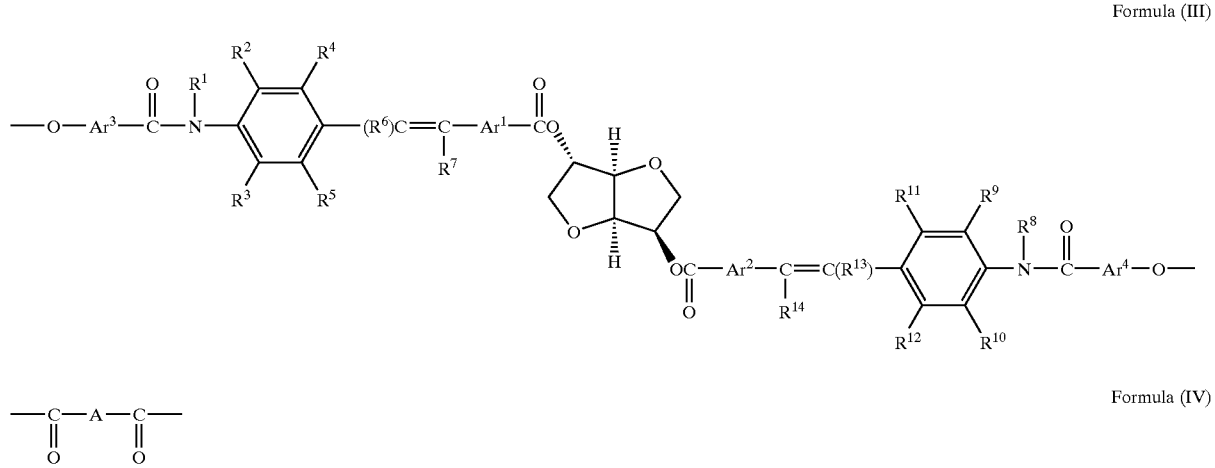

Formula (IV)

$$—\underset{\underset{O}{\|}}{C}—A—\underset{\underset{O}{\|}}{C}—$$

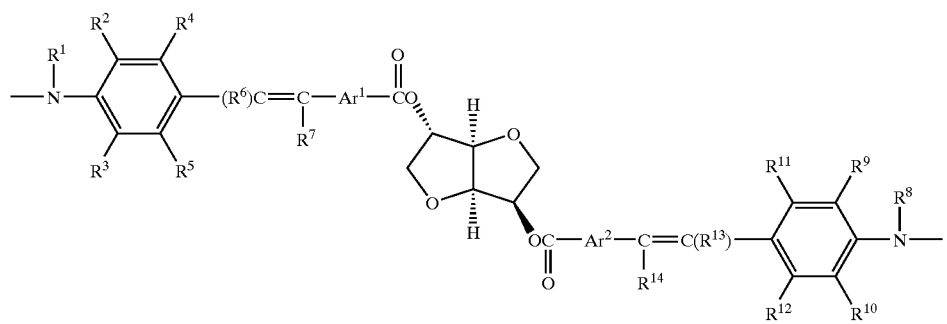

Formula (I)

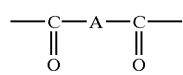

Formula (II)

wherein in the general formula (I), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group, and wherein in the general formula (II), A represents a divalent substituent.

20. A recording medium comprising a liquid crystal compound and at least one optically active polyesteramide, wherein the optically active polyesteramide includes at least a structural unit represented by the following general formula (III) and a structural unit represented by the following general formula (IV):

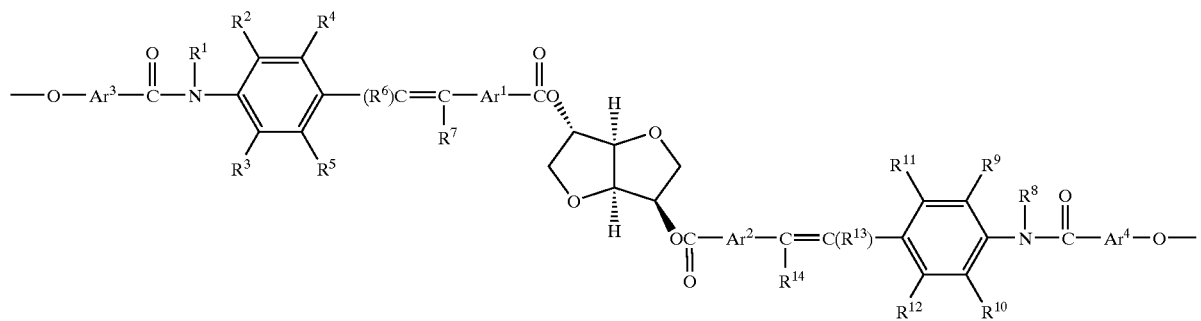

Formula (III)

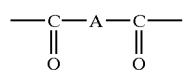

Formula (IV)

wherein in the general formula (III), $R^1$ and $R^8$ independently represent a hydrogen atom, an alkyl group, or an aryl group; $R^2$ to $R^5$ and $R^9$ to $R^{12}$ independently represent a hydrogen atom, a halogen atom, an alkyl group, or an alkoxy group; $R^1$ and $R^2$ as well as $R^8$ and $R^9$ may form a 5- or 6-membered ring; $R^6$ and $R^7$ as well as $R^{13}$ and $R^{14}$ independently represent a hydrogen atom or an alkyl group; $Ar^1$ and $Ar^2$ independently represent a single bond, 1,4-phenylene, naphthalene-2,6-diyl, or 1,4-phenylene or naphthalene-2,6-diyl substituted by at least one halogen atom, alkyl group or alkoxy group; $Ar^3$ and $Ar^4$ independently represent a divalent aromatic group, and wherein in the general formula (IV), A represents a divalent substituent.

* * * * *